US008874608B2

(12) United States Patent
Song et al.

(10) Patent No.: US 8,874,608 B2
(45) Date of Patent: Oct. 28, 2014

(54) MOBILE TERMINAL AND METHOD OF SEARCHING A CONTACT IN THE MOBILE TERMINAL

(75) Inventors: Yoo-Mee Song, Seoul (KR); Byung-Sang Yeo, Gyeonggi-Do (KR); Yee-Rang Yun, Seoul (KR); Hye-Youn Cho, Seoul (KR); Seong-Yoon Cho, Seoul (KR); Kyoung-Hee Son, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 12/714,408

(22) Filed: Feb. 26, 2010

(65) Prior Publication Data

US 2011/0078184 A1   Mar. 31, 2011

(30) Foreign Application Priority Data

Sep. 28, 2009   (KR) ........................ 10-2009-0092032

(51) Int. Cl.
*G06F 17/30*   (2006.01)
*G06Q 10/10*   (2012.01)

(52) U.S. Cl.
CPC ................................... *G06Q 10/107* (2013.01)
USPC .......................................................... 707/770

(58) Field of Classification Search
CPC .................................................... G06Q 50/01
USPC .................. 707/636, 705, 706, 770
See application file for complete search history.

(56) References Cited

U.S. PATENT DOCUMENTS

| 2004/0119760 A1* | 6/2004 | Grossman et al. ............ 345/854 |
|---|---|---|
| 2009/0111495 A1 | 4/2009 | Sjolin et al. |
| 2009/0204601 A1* | 8/2009 | Grasset ............................. 707/5 |
| 2010/0087230 A1* | 4/2010 | Peh et al. ....................... 455/566 |
| 2010/0144323 A1* | 6/2010 | Collins et al. ............... 455/414.1 |
| 2010/0199340 A1* | 8/2010 | Jonas et al. ....................... 726/8 |
| 2010/0281113 A1* | 11/2010 | Laine et al. ................... 709/204 |
| 2010/0333019 A1* | 12/2010 | Oschwald et al. ............ 715/810 |
| 2011/0053578 A1* | 3/2011 | Rochford ..................... 455/418 |
| 2011/0319058 A1* | 12/2011 | Ankolekar et al. ........ 455/414.1 |

FOREIGN PATENT DOCUMENTS

CN   101410791   4/2009

OTHER PUBLICATIONS

DanielJvdBerg: "Syncing Google Contacts goes Wrong with Google maps," Jul. 2008, XP-002638450.
musicvan: "Contact address: Google Maps search does not work", Apple Support Communities, Jul. 2008, XP-002638451.
The State Intellectual Property Office of the People's Republic of China Application Serial No. 201010263514.8, Office Action dated Apr. 2, 2013, 8 pages.
The State Intellectual Property Office of the People's Republic of China Application Serial No. 201010263514.8, Office Action dated Jan. 6, 2014, 6 pages.

* cited by examiner

*Primary Examiner* — Rehana Perveen
*Assistant Examiner* — Alexander Khong
(74) *Attorney, Agent, or Firm* — Lee, Hong, Degerman, Kang & Waimey

(57) ABSTRACT

A mobile terminal includes a wireless communication unit communicating with a server providing a social network service, a memory storing a contact list and account information related to the social network service, a user input unit receiving a search query, a controller searching for a contact person in the contact list based on the search query, the controller also connecting and transmitting information of the contact person found in the contact list to the server, and receiving a search result from the server, and a display unit displaying the search result.

21 Claims, 15 Drawing Sheets

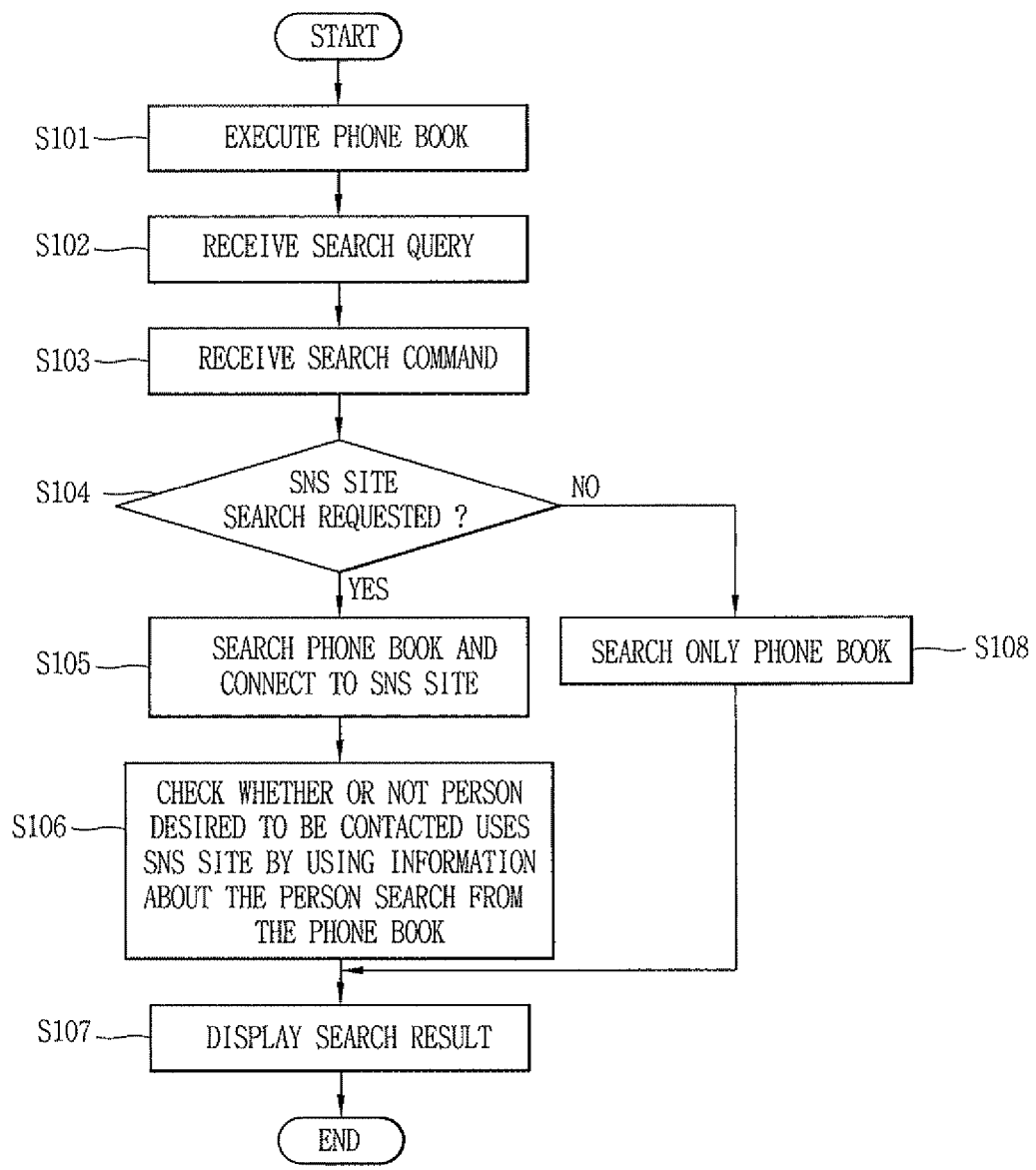

MOBILE TERMINAL AND METHOD OF SEARCHING A CONTACT IN THE MOBILE TERMINAL

CROSS REFERENCE TO RELATED APPLICATIONS

Pursuant to 35 U.S.C. §119(a), this application claims the benefit of earlier filing date and right of priority to Korean Application No. 10-2009-0092032 filed on Sep. 28, 2009, the contents of which are hereby incorporated by reference herein in their entirety.

FIELD OF THE INVENTION

The present disclosure relates to a mobile terminal which has a function for searching a contact or friend. In particular, a contact can be searched by the mobile terminal by utilizing both information from a contact list stored in the mobile terminal and information obtained from a server providing a social network service or SNS provider.

DESCRIPTION OF THE RELATED ART

As functions of terminals, such as personal computers, notebook computers, and mobile phones, become more diversified, the terminals are implemented as multimedia players supporting complicated functions. For example, the terminals can be used for capturing images or video, reproducing music or video files, playing games, and receiving broadcast signals.

In general, the terminals may be divided into mobile terminals and stationary terminals according to their mobility. The mobile terminals may be divided into handheld terminals and vehicle mountable terminals according to their modes of portability.

Efforts are ongoing to support and increase the functionality of mobile terminals. Such efforts include software and hardware improvements, as well as changes and improvements in the structural components which form the terminals.

In general, for a user of a mobile terminal to check whether a contact person listed in a contact list stored in the mobile terminal uses a social network service (SNS), the user must perform two separate tasks. First, the contact person must be searched in the contact list. And then, the user must connect to the SNS site in order to find whether the contact person listed in the contact list of the mobile terminal is registered with the SNS site by inputting a search query, such as a name, an e-mail, and a phone number of the contact person. Therefore, the contact list of the mobile terminal is not interlinked with the SNS site for searching the contact person. The present disclosure provides interlinking the information of the contact list in the mobile terminal with information obtained from the SNS site for easy search of the contact person from both the contact list and the SNS site by entering a common search query.

SUMMARY OF THE INVENTION

According to an embodiment of the present invention, a mobile terminal includes a wireless communication unit communicating with a server providing a social network service, a memory storing a contact list and account information related to the social network service, a user input unit receiving a search query, a controller searching for a contact person in the contact list based on the search query, the controller also connecting and transmitting information of the contact person found in the contact list to the server, and receiving a search result from the server, and a display unit displaying the search result.

According to another embodiment of the present invention, a mobile terminal includes a user input unit receiving a search query from a user, a controller searching for a contact from contact information stored in the mobile terminal based on the search query, a wireless communication unit connecting to a website for a social networking service, transmitting information of the contact found from the contact information to the website, and receiving a search result from the website, and a display unit displaying the search result. The search result is obtained by the website by matching the information of the contact received from the mobile terminal to information of social network service subscribers stored at the website.

According to yet another embodiment of the present invention, a method of searching for a contact in a mobile terminal includes connecting to a server providing a social network service and having information about social network service subscriber by using user account information related to the social network service, receiving a search query for searching for the contact from the server, displaying a search result received from the server, and updating a contact list stored in the mobile terminal according to the search result.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIG. 5 is a flowchart illustrating searching for a contact person or friend in a mobile terminal according to an embodiment of the present invention.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In the following description, usage of suffixes such as "module," "part" or "unit" used for referring to elements is given merely to facilitate explanation of the present invention, without having any significant meaning by itself.

The mobile terminal described in the present disclosure may include mobile phones, smart phones, notebook computers, digital broadcast receivers, PDAs (Personal Digital Assistants), PMPs (Portable Multimedia Player), and navigation devices. It would be understood by a person in the art that the configuration according to the embodiments of the present invention can be also applicable to the fixed types of terminals, such as digital TVs or desk top computers, except for any elements especially configured for a mobile purpose.

Figure 1:
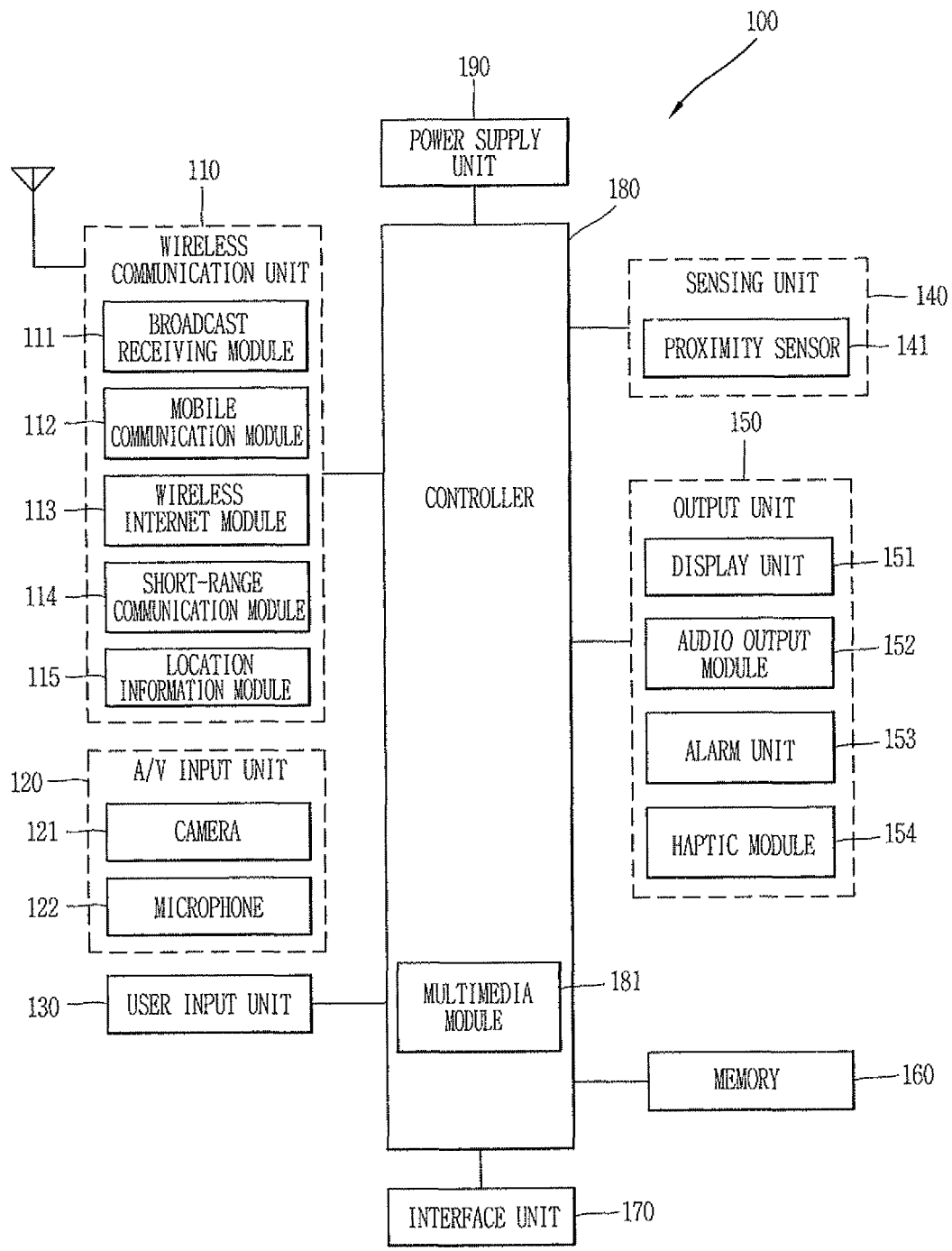
FIG. 1 is a schematic block diagram of a mobile terminal according to an embodiment of the present invention.

Referring to FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. While FIG. 1 shows that the mobile terminal 100 has various components, it should be understood that implementing all of the illustrated components is not a requirement. Greater or fewer components may be implemented alternatively.

The wireless communication unit 110 typically includes one or more components allowing radio communication between the mobile terminal 100 and a wireless communication system or a network in which the mobile terminal 100 is located. For example, the wireless communication unit 110 may include at least a broadcast receiving module 111, a mobile communication module 112, a wireless Internet module 113, a short-range communication module 114, or a location information module 115.

The broadcast receiving module 111 receives broadcast signals and/or broadcast associated information from an external broadcast management server or other network entity via a broadcast channel. The broadcast channel may include a satellite channel and/or a terrestrial channel. The broadcast management server may generate and transmit a broadcast signal and/or broadcast associated information or may receive a previously generated broadcast signal and/or broadcast associated information and transmit the broadcast signal and/or broadcast associated information to the mobile terminal 100.

The broadcast signal may include a TV broadcast signal, a radio broadcast signal, and/or a data broadcast signal. The broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and received by the mobile communication module 112.

The broadcast signal may exist in various forms. For example, it may exist in the form of an electronic program guide (EPG) of digital multimedia broadcasting (DMB) or an electronic service guide (ESG) of digital video broadcast-handheld (DVB-H).

The broadcast receiving module 111 may be configured to receive broadcast signals by using various types of broadcast systems. Such broadcast systems may include multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). The broadcast receiving module 111 may be configured to be suitable for every broadcast system transmitting broadcast signals as well as the digital broadcast systems. Broadcast signals and/or broadcast-associated information received via the broadcast receiving module 111 may be stored in the memory 160 or anther type of storage medium.

The mobile communication module 112 transmits and/or receives radio signals to and/or from at least one of a base station, such as access point or Node B, an external terminal or other user devices and a server or other network entities. Such radio signals may include a voice call signal, a video call signal or various types of data according to text and/or multimedia message transmission and/or reception.

The wireless Internet module 113 supports wireless Internet access for the mobile terminal 100. The wireless Internet module 113 may be internally or externally coupled to the mobile terminal 100. The wireless Internet access technique implemented may include a WLAN (Wireless LAN) (Wi-Fi), WiBro (Wireless broadband), WiMax (World Interoperability for Microwave Access), or HSDPA (High Speed Downlink Packet Access).

The short-range communication module 114 supports short range communications. Some examples of short-range communication technology include BLUETOOTH™, Radio Frequency IDentification (RFID), Infrared Data Association (IrDA), and Ultra-WideBand (UWB), ZIGBEE™.

The location information module 115 checks or acquires a location or position of the mobile terminal 100. A typical example of the location information module is a GPS (Global Positioning System).

The A/V input unit 120 is configured to receive an audio or video signal. The A/V input unit 120 may include a camera 121 or other image capture device and a microphone 122 or other sound pick-up device. The camera 121 processes image data of still pictures or video obtained by an image capture device in a video capturing mode or an image capturing mode. The processed image frames may be displayed on a display unit 151 or other visual output device.

The image frames processed by the camera 121 may be stored in the memory 160 or other storage medium, or transmitted via the wireless communication unit 110. Two or more cameras 121 may be provided according to the configuration of the mobile terminal 100.

The microphone 122 may receive sounds or audible data in a phone call mode, a recording mode, and a voice recognition mode, and can process such sounds into audio data. The processed audio voice data, such as voice, may be converted for output into a format transmittable to a mobile communication base station or other network entity via the mobile communication module 112 in the phone call mode. The microphone 122 may implement various types of noise canceling or suppression algorithms to cancel or suppress noise or interference generated while receiving and transmitting audio signals.

The user input unit 130 or other user input device may generate input data in response to commands entered by a user to control various operations of the mobile terminal 100. The user input unit 130 may include at least a keypad, a dome switch, a jog wheel, a jog switch, or a touch pad, such as a touch sensitive member that detects changes in resistance, pressure, and capacitance generated by a contact.

The sensing unit 140 or other detection means detects a current status of the mobile terminal 100 such as an opened or closed state of the mobile terminal 100, a location of the mobile terminal 100, the presence or absence of user contact with the mobile terminal 100 or touch inputs, the orientation of the mobile terminal 100, or an acceleration or deceleration movement and direction of the mobile terminal 100. The sensing unit 140 generates commands or signals for controlling the operation of the mobile terminal 100.

For example, when the mobile terminal 100 is implemented as a slide type mobile phone, the sensing unit 140 may sense whether the slide phone is opened or closed. In addition, the sensing unit 140 can detect whether the power supply unit 190 supplies power or whether the interface unit 170 is coupled with an external device. The sensing unit 140 may include a proximity sensor 141.

The output unit 150 is configured to output an audio signal, a video signal, an alarm signal, and a tactile signal such as vibration signal. The output unit 150 may include the display unit 151, an audio output module 152, an alarm unit 153, and a haptic module.

The display unit 151 may display or output information processed in the mobile terminal 100. For example, when the mobile terminal 100 is in a phone call mode, the display unit 151 may display a User Interface (UI) or a Graphic User Interface (GUI) associated with a call or other communication such as text messaging or multimedia file downloading. When the mobile terminal 100 is in a video call mode or image capturing mode, the display unit 151 may display a captured image and/or received image and a UI or GUI that shows videos or images and related functions.

The display unit 151 may include at least a Liquid Crystal Display (LCD), a Thin Film Transistor-LCD (TFT-LCD), an Organic Light Emitting Diode (OLED) display, a flexible display, or a three-dimensional (3D) display. Some of the displays may be configured to be transparent or light-transmissive to allow viewing of the exterior, and may be called transparent displays. A typical transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units 151 or other display means according to its particular desired embodiment. For example, a plurality of display units 151 may be separately or integrally disposed on one surface of the mobile terminal 100, or may be separately disposed on mutually different surfaces.

When the display unit 151 and touch sensor for detecting a touch operation are overlaid in a layered manner to form a touch screen, the display unit 151 may function as both an input device and an output device. The touch sensor may have a form of a touch film, a touch sheet, or a touch pad.

The touch sensor may be configured to convert pressure applied to a particular portion of the display unit 151 or a change in the capacitance generated at a particular portion of the display unit 151 into an electrical input signal. The touch sensor may be configured to detect the pressure when a touch is applied, as well as the touched position and area.

When there is a touch input with respect to the touch sensor, a corresponding signal is transmitted to a touch controller (not shown). The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 detects the presence or absence of an object relative to a certain detection surface or an object that exists nearby by using the force of electromagnetism or infrared rays without a physical contact. Thus, the proximity sensor 141 may have a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. If the touch screen is the capacitance type, proximity of a pointer is detected by a change in electric field according to the proximity of the pointer. In this case, the touch screen or the touch sensor may be classified as a proximity sensor.

In the following description, for the sake of brevity, recognition of the pointer positioned to be close to the touch screen will be called a "proximity touch", while recognition of actual contacting of the pointer on the touch screen will be called a "contact touch." When the pointer is in the state of the proximity touch, it means that the pointer is positioned to correspond vertically to the touch screen.

By employing the proximity sensor 141, a proximity touch and a proximity touch pattern, such as a proximity touch distance, a proximity touch speed, a proximity touch time, a proximity touch position, or a proximity touch movement state, can be detected. Information corresponding to the detected proximity touch operation and the proximity touch pattern can be output to the touch screen.

The audio output module 152 may convert and output as sound audio data received from the wireless communication unit 110 or stored in the memory 160 in a call signal reception mode, a call mode, a record mode, a voice recognition mode, and a broadcast reception mode. Also, the audio output module 152 may provide audible outputs related to a particular function performed by the mobile terminal 100, for example, a call signal reception sound and a message reception sound. The audio output module 152 may include a speaker, a buzzer, or other sound generating device.

The alarm unit 153 or other type of user notification means may provide outputs to inform about the occurrence of an event of the mobile terminal 100. Typical events may include call reception, message reception, key signal inputs, and a touch input. In addition to audio or video outputs, the alarm unit 153 may provide outputs in a different manner to inform about the occurrence of an event.

For example, the alarm unit 153 may provide an output in the form of vibrations or other tactile or sensible outputs. When a call, a message, or some other incoming communication is received, the alarm unit 153 may provide tactile outputs or vibration to inform the user. By providing such tactile outputs, the user can recognize the occurrence of various events even if the mobile terminal 100 is in the user's pocket.

Outputs informing about the occurrence of an event may be also provided via the display unit 151 or the audio output module 152. The display unit 151 and the audio output module 152 may be classified as a part of the alarm unit 153.

The haptic module 154 generates various tactile effects that a user can feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as a pin arrangement vertically moving with respect to a contact skin, a spray force or suction force of air through a jet orifice or a suction opening, a contact on the skin, a contact of an electrode, electrostatic force, or an effect reproducing the sense of cold and warmth using an element that can absorb or generate heat.

The haptic module 154 may be implemented to allow the user to feel a tactile effect through a muscle sensation such as the fingers or arm of the user, as well as transferring the tactile effect through direct contact. Two or more haptic modules 154 may be provided according to the configuration of the mobile terminal 100.

The memory 160 may store software programs used for the processing and controlling operations performed by the controller 180, or may temporarily store data, such as a phonebook, messages, still images, and video, that are input or output. In addition, the memory 160 may store data regarding various patterns of vibrations and audio signals output when a touch is input via the touch screen.

The memory 160 may include at least one type of storage medium including a Flash memory, a hard disk, a multimedia card micro type, a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, or a card-type memory such as SD or DX memory. Also, the mobile terminal 100 may be operated with a web storage device that performs the storage function of the memory 160 over the Internet.

The interface unit 170 serves as an interface with every external device connected to the mobile terminal 100. For example, the external devices may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, or earphone ports.

The identification module may be a chip that stores various information for authenticating the authority of using the mobile terminal 100 and may include a user identity module (UIM), a subscriber identity module (SIM), or a universal subscriber identity module (USIM). In addition, the device having the identification module or identifying device may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied through the interface unit to the mobile terminal 100 or may serve as a passage to allow various command signals input by the user from the cradle to be transferred to the mobile terminal 100. Various command signals or power input from the cradle may operate as signals for recognizing that the mobile terminal 100 is properly mounted on the cradle.

The controller 180 typically controls the general operations of the mobile terminal 100. For example, the controller 180 performs controlling and processing associated with voice calls, data communications, and video calls. The controller 180 may also perform pattern recognition processing to recognize a handwriting input or a picture drawing input performed on the touch screen as characters or images, respectively.

The controller 180 may include a multimedia module 181 for reproducing multimedia data. The multimedia module 181 may be configured within the controller 180 or may be configured to be separated from the controller 180.

The power supply unit 190 provides power required by various components under the control of the controller 180. The provided power may be internal power, external power, or a combination thereof.

Various embodiments described herein may be implemented in a computer-readable or similar medium using, for example, software, hardware, or any combination of software and hardware. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
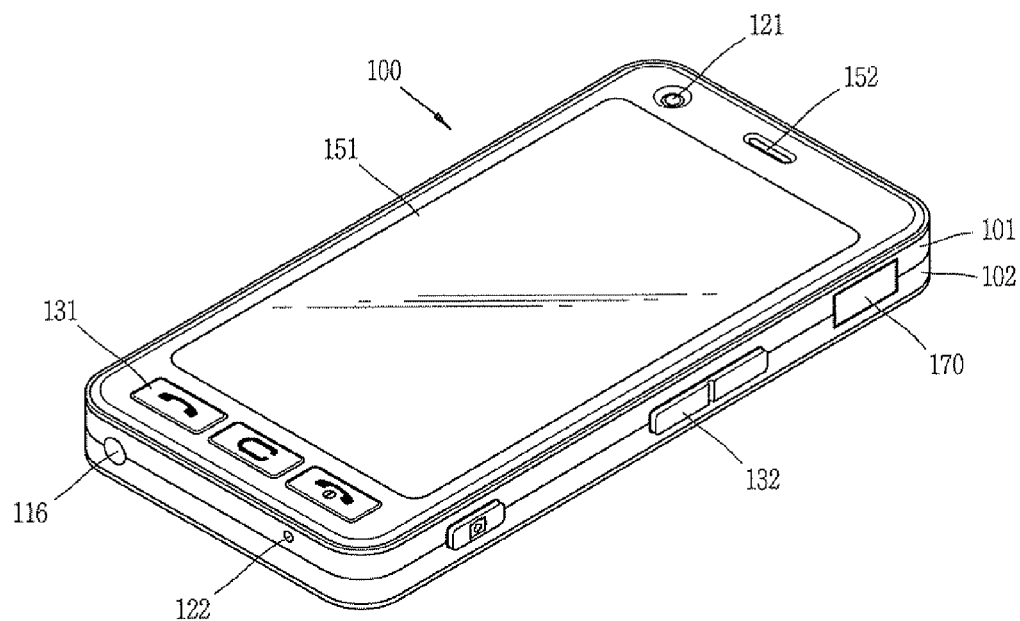
FIG. 2A is a front perspective view of a mobile terminal according to an embodiment of the present invention.

In FIG. 2A, the mobile terminal 100 is shown to have a bar type terminal body. However, the present invention can also be applicable to a slide type mobile terminal, a folder type mobile terminal, a swing type mobile terminal, and a swivel type mobile terminal including two or more bodies.

The terminal body includes a case, such as casing, housing, or cover, constituting the external appearance of the terminal body. Referring to FIG. 2A, the case may be composed of a front case 101 and a rear case 102. Various electronic components are installed in the space between the front case 101 and the rear case 102. One or more intermediate cases may be additionally disposed between the front case 101 and the rear case 102. The cases may be formed by injection-molding a synthetic resin or may be made of a metallic material such as stainless steel (STS) or titanium (Ti).

The display unit 151, the audio output module 152, camera 121, and the user input unit 130 including manipulation units 131 and 132, the microphone 122, and the interface unit 170 may be located on the terminal body, mainly on the front case 101. The display unit 151 occupies the largest portion of the front surface of the front case 101. The audio output module 152 and the camera 121 are disposed near one end portion of the display unit 151, and the manipulation unit 131 and the microphone 122 are disposed near the other end of the display unit 151. The manipulation unit 132 and the interface unit 170 may be disposed at sides of the terminal body formed by the front case 101 and the rear case 102.

The manipulation units 131 and 132 that are part of the user input unit 130 are manipulated to receive commands for controlling the operation of the mobile terminal 100. The manipulation units 131 and 132 may be called a manipulating portion, and can be manipulated in a tactile manner by the user.

Content input via the first and second manipulation units 131 and 132 may be variably set. For example, the first manipulation unit 131 receives commands such as start, end, or scroll, and the second manipulation unit 132 may receive commands for adjusting volume of sound output from the audio output unit 152 or converting to a touch recognition mode for the display unit 151.

Figure 2B:
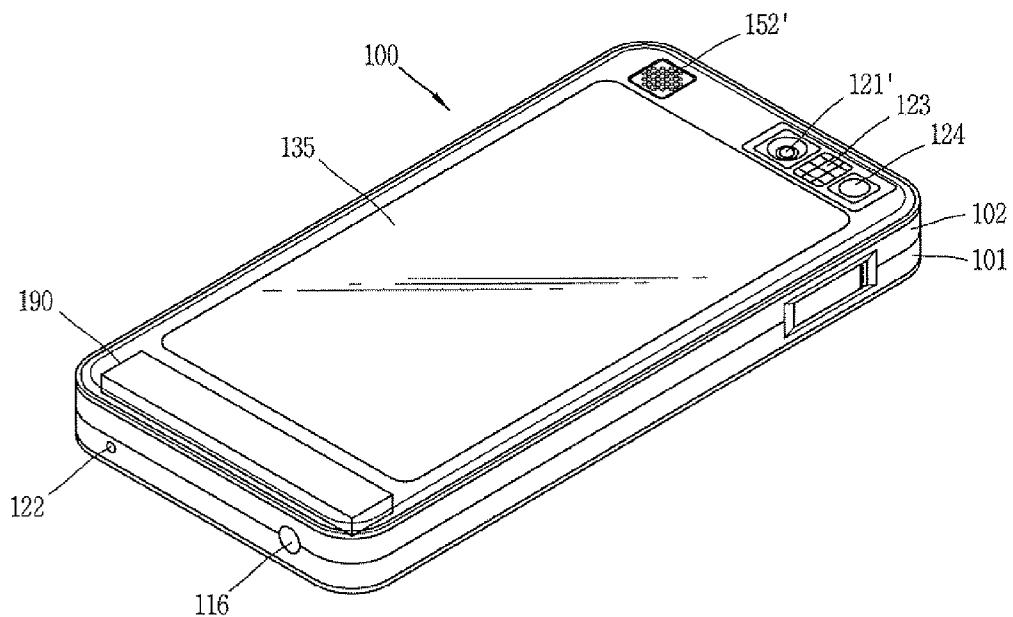
FIG. 2B is a rear perspective view of a mobile terminal according to an embodiment of the present invention.

FIG. 2B is a rear perspective view of the mobile terminal 100 illustrated in FIG. 2A. With reference to FIG. 2B, a second camera 121' may additionally be disposed on a rear surface of the terminal body, namely, on the rear case 102. The second camera 121' may have an image capture direction which is substantially opposite to that of the camera 121 disposed on the front surface of the terminal body and may support a different resolution than the camera 121.

For example, camera 121 may operate with a relatively lower resolution to capture images of the user's face and immediately transmit the images to another party in real-time during video call communication. The second camera 121' may operate with a relatively higher resolution to capture images of general objects with high picture quality, which may not require immediate transmission in real time. The cameras 121 and 121' may be installed on the mobile terminal 100 such that they are rotated or popped up.

A flash 123 and a mirror 124, may be additionally disposed adjacent to the camera 121'. When an image of the subject is captured with the second camera 121', the flash 123 may illuminate the subject. The mirror 124 allows the user to see himself/herself when he/she wants to capture his/her own image by using the second camera 121'.

A second audio output unit 152' may be additionally disposed on the rear surface of the terminal body. The second audio output unit 152' may implement a stereoscopic function along with the audio output unit 152 disposed on the front surface of the terminal body, and may be used for implementing a speaker phone mode during call communication.

A broadcast signal receiving antenna 116 may be disposed at a side of the terminal body in addition to an antenna (not shown) that supports mobile communications. The antenna 116 forming a portion of the broadcast reception module 111 may be installed to be protracted.

A power supply unit 190 for supplying power to the mobile terminal 100 may be mounted on the terminal body. The power supply unit 190 may be installed in the terminal body or may be directly detached from the outside of the terminal body.

A touch pad 135 for detecting a touch may be additionally mounted on the rear case 102. The touch pad 135 may be configured to be light-transmissive like the display unit 151. In this case, when the display unit 151 is configured to output visual information from both sides, the visual information can be recognized through the touch pad 135.

Information output to both sides of the display unit 151 may be controlled by the touch pad 135. Alternatively, a display may be additionally mounted on the touch pad 135, and a touch screen may be disposed on the rear case 102.

The touch pad 135 is operated in relation to the display unit 151 of the front case 101. The touch pad 135 may be disposed to be parallel to the rear side of the display unit 151. The touch pad 135 may have the same or smaller size than the display unit 151.

Figure 3:
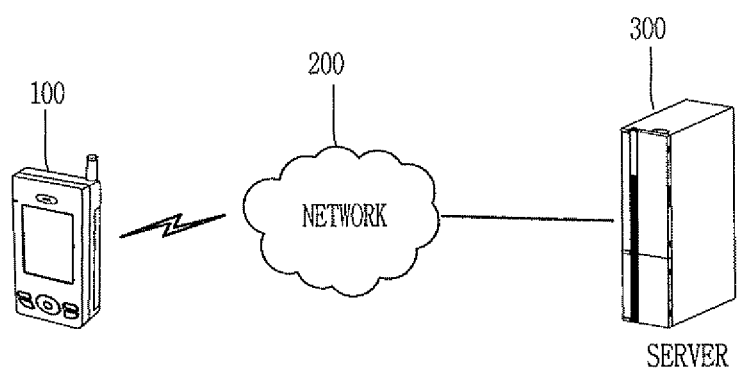
FIG. 3 illustrates a social network system related to the present invention.

FIG. 3 illustrates a social network service (SNS) system related to the present invention. The SNS provides a community service allowing a user to share information with others and build personal connections online. For example, the SNS includes Cyworld™, Facebook™, MySpace™, Twitter™, Bebo™, Orkut™, LinkedIn™, and Nesopia™.

With reference to FIG. 3, an SNS system includes a mobile terminal 100, a network 200, and an SNS server 300. The mobile terminal 100 is a terminal in which a client application can be installed to receive the SNS, namely, an SNS client.

A client application for using a service provided by a particular SNS site is installed in the mobile terminal 100 according to a user command. The client application may be present in each SNS site and provided from each SNS site. Alternatively, the client application may be an integrated SNS client application implemented to be connected to every SNS site.

When installation of the client application is completed, the terminal user may register accounts with respect to one or more SNS sites the user uses through an environment setting menu of the client application. For example, the terminal user may execute a client application for receiving a Twitter™ service and select the environment setting menu.

Figure 4A:
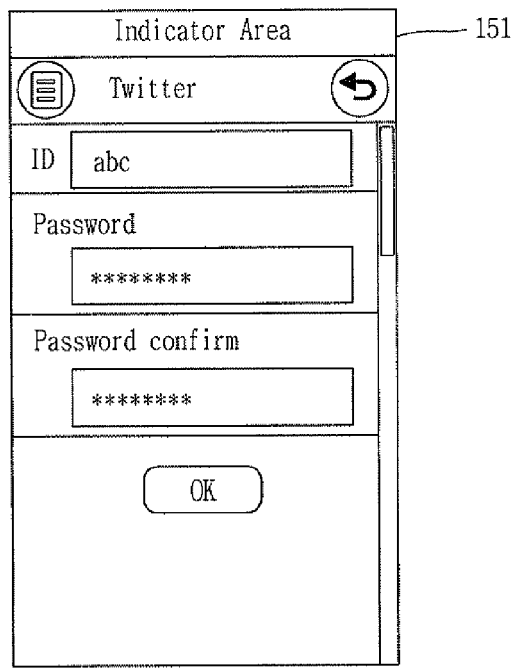
FIGS. 4A and 4B illustrate registering at an SNS site by a mobile terminal according to an embodiment of the present invention.

Then, as shown in FIG. 4A, the mobile terminal 100 displays an account registration screen image to receive input of account information. The user may input information, such as ID and password, of each item by manipulating the user input unit 130 from the displayed account registration screen.

The controller 180 of the mobile terminal 100 stores the information received via the user input unit 130 in the memory 160. Thereafter, when the client application is executed, the mobile terminal 100 connects to the SNS site and performs user authentication at the corresponding SNS site by using the previously registered account information.

If the mobile terminal 100 has an integrated or common client application allowing connection to various SNS sites, the user may register information regarding one or more SNS sites in the mobile terminal 100. The mobile terminal 100 may also store the SNS site information and account information about the corresponding site.

Figure 4B:
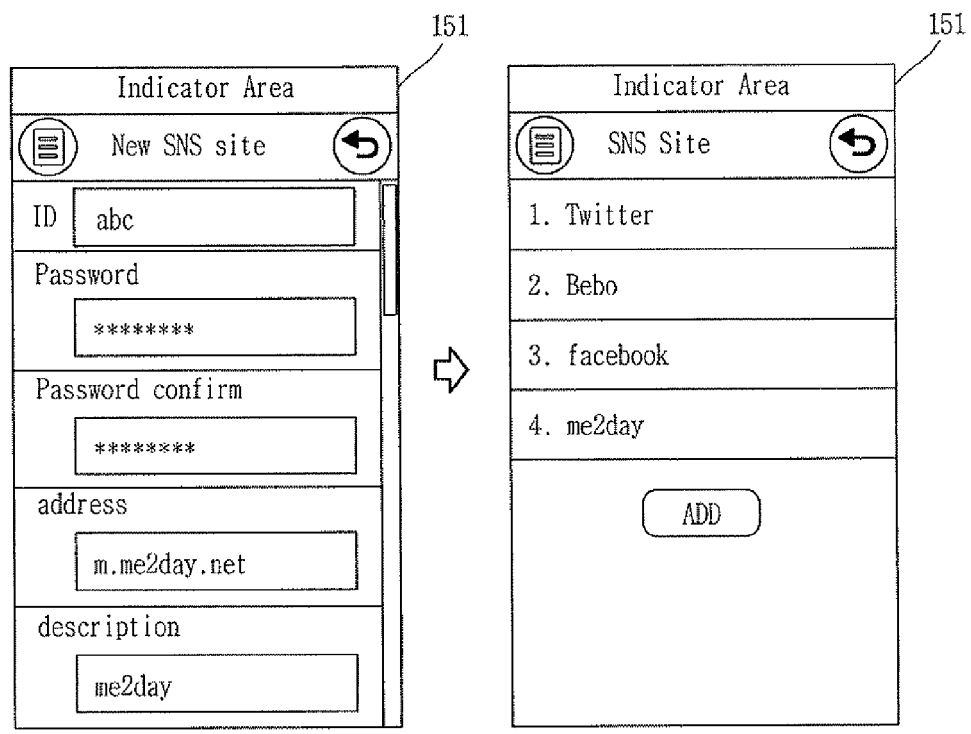

For example, when the user selects an SNS site menu, the controller 180 of the mobile terminal 100 executes an SNS site menu that can manage the SNS site. When the SNS site menu is executed, the controller displays a registered SNS site list. If there is no registered SNS site list, the controller 180 displays an SNS site registration screen on the display unit 151, as shown in FIG. 4B, allowing registration at a new SNS site.

The user enters account information such as an SNS site address, the name of an SNS site, an ID or user name and a password with respect to the SNS site on the SNS site registration screen through the user input unit 130. When the SNS site information is received, the controller 180 of the mobile terminal 100 stores the received SNS site information in the memory 160 and displays the registered SNS site list.

If the mobile terminal 100 does not have a client application, it may request the client application from the SNS server 300 to download and install the client application, or may connect to an SNS site through a Web browser. The user of the mobile terminal 100 can share various information such as interest and/or personal connection information online through the client application.

The mobile terminal 100 may connect to the network 200 through the wireless communication unit 110 and then connect to the SNS server 300 via the network 200 to receive information or contents from the SNS server 300 or upload information to the SNS server 300. The SNS server 300 searches a database for an SNS site subscriber/user in response to a request from the mobile terminal 100, and transmits the searched subscriber/user information to the mobile terminal 100. In addition, the SNS server 300 may add or delete a searched subscriber/user to or from a friend, or register the searched subscriber/user as a new contact person according to a request by the mobile terminal 100.

Information such as subscriber information, images, photos, video, sound source, personal connection information, or bulletin board messages including text is stored in the database of the SNS server 300. In addition, the SNS server 300 may check whether the mobile terminal 100 has been registered as a subscriber for the SNS through an authentication procedure using subscriber information. If the mobile terminal 100 is a subscriber terminal, the SNS server 300 authenticates the mobile terminal 100 such that it can use the SNS.

Referring to FIG. 5, in a contact person search method by a mobile terminal according to an embodiment of the present invention, the controller 180 of the mobile terminal 100 executes a contact list or phone book in response to a user input (S101). Then the controller 180 displays the screen image of the contact list or phone book on the display unit 151.

Subsequently, the controller 180 receives a search query via the user input unit 130 and the received search query is displayed on the contact list/phone book screen (S102). For example, when a search query input window is selected by the user on the contact list/phone book screen, the controller 180 enters a text input mode and provides a cursor to the search query input window. Thereafter, the controller 180 displays data received via the user input unit 130 on the search query input window.

After inputting of the search query is completed, the controller 180 receives a search command via the user input unit 130 (S103). When the search command is received, the controller 180 checks a pre-set search option setting to determine whether an option for "Find in SNS site" has been set (S104).

If "Find in SNS site" has been set, the controller 180 searches a contact person including the search query from the contact list/phone book and connects to a pre-set SNS site (S105). In other words, the controller 180 searches for a contact person according to the received search query or a contact person including the input search query from the contact list/phone book. Further, the controller 180 connects to the SNS site by using pre-set user information such as name and password while searching for the contact person from the phone book.

After the contact list/phone book of the mobile terminal 100 is searched for the contact person, the controller 180 requests a subscriber search from the SNS site by using information such as an e-mail and a phone number of the contact person to be searched (S106). In other words, the controller 180 searches the contact list/phone book of the mobile terminal 100 for the contact person and connects to the pre-set SNS site. The controller 180 connects to the SNS site and requests the SNS server 300 to check whether the searched contact person uses the SNS site.

For the request, the mobile terminal 100 transmits identification information such as an e-mail, a phone number, and a user name of the searched contact person, along with a request message, to the SNS server 300. The SNS server 300 checks whether the contact person is an SNS site subscriber by comparing the received identification information of the contact person and subscriber information of the SNS site in response to the request from the mobile terminal 100.

If the searched contact person uses the SNS site, the controller 180 checks whether the corresponding contact person is registered as a friend of the user of the mobile terminal 100. Moreover, the controller 180 may also request to check whether the searched contact person uses one or more SNS sites to which the terminal user is registered.

When information related to the searched contact person is received from the SNS site, the controller 180 displays information about the searched contact person indicating whether the contact person uses the SNS site (S107). If the searched contact person uses the SNS site, the controller 180 displays an icon indicating the corresponding SNS site at one side of the information about the searched contact person. In other words, the controller 180 displays a particular icon, such as a logo or an initial of the SNS site used by the searched contact person, to allow the terminal user to recognize the SNS site used by the corresponding contact person.

If the searched contact person uses the SNS site but is not registered as a friend of the terminal user, the controller 180 displays a friend add icon with respect to the corresponding SNS site. If the searched contact person does not use the SNS site, the controller 180 displays an invitation icon. If the searched contact person uses the SNS site and is registered as a friend of the user, the controller 180 displays a delete icon for releasing the friend relation.

Depending on the search result, the controller 180 may add new information with regard to the searched contact person to the contact list/phone book indicating whether the contact person uses the SNS site. Specifically, the controller 180 inserts new information, such as the SNS site used by the searched contact person and whether the searched contact person is registered as a friend, to certain field values of the contact list/phone book and stores the updated information about the contact person in the memory 160. Further, the controller 180 updates the field values based on a pre-set period or updates the corresponding field values upon request by the terminal user.

At S104, if "Find in SNS site" has not been set, the controller 180 searches for a contact person only in the contact list/phone book of the mobile terminal 100 based on the search query (S108). When searching is complete, the controller 180 displays a list of searched contact persons on the display screen (S107).

Figure 6A:
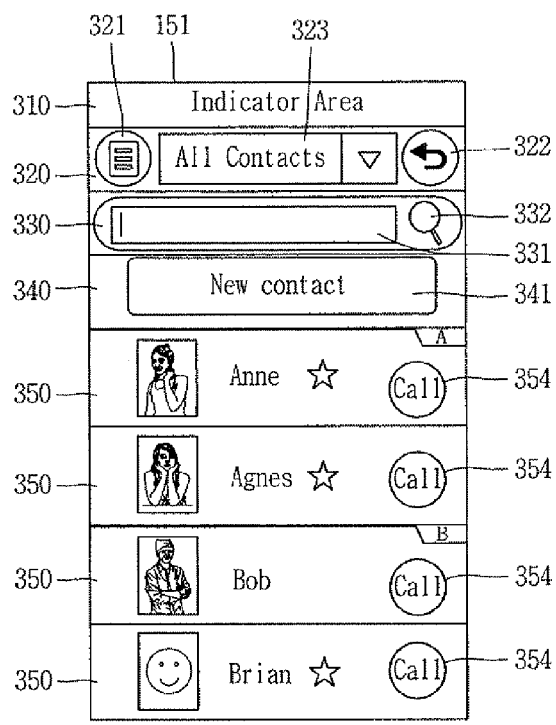
FIGS. 6A to 6E illustrate searching for a contact person or friend in a mobile terminal by connecting to an SNS site according to an embodiment of the present invention.

FIGS. 6A to 6E illustrate searching for a contact person or friend in a mobile terminal 100 according to an embodiment of the present invention. With reference to FIG. 6A, the controller 180 of the mobile terminal 100 executes the contact list/phone book in response to a user input. Subsequently, the controller 180 displays the screen image of the contact list/phone book on the display screen.

The screen image may include a first display area 310 displaying the status of the mobile terminal 100, such as signal strength, message, and set alarm, a second display area 320 displaying a menu icon 321, a cancel icon 322, and a drop down list 323 for selecting a title or a list view method, a third display area 330 displaying a search query input window 331 and a search execution icon 332, a fourth display area 340 displaying an icon 341 for inputting a command for adding a new contact person, and a fifth display area 350 displaying a contact list of persons registered in the contact list/phone book. The contact list is displayed on the fifth display area 350, and a photo image and a name of each contact person, a call icon 354, icon(s) 351 indicating an SNS site(s) in use, a friend addition icon 352 or friend invitation icon 353, and a friend release icon (not shown) are also displayed as shown in FIGS. 6C and 6D.

When the search query input window 331 of the executed screen image is selected, the controller 180 enters a text input mode and displays a cursor at the search query input window 331. Thereafter, when a search query is received via the user input unit 130, the controller 180 displays the received search query in the search query input window 331 of the contact list/phone book screen.

Figure 6B:
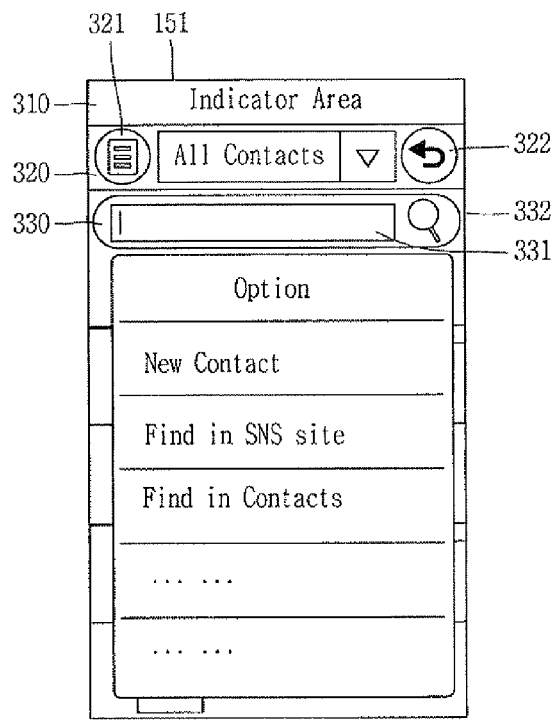
Figure 6C:
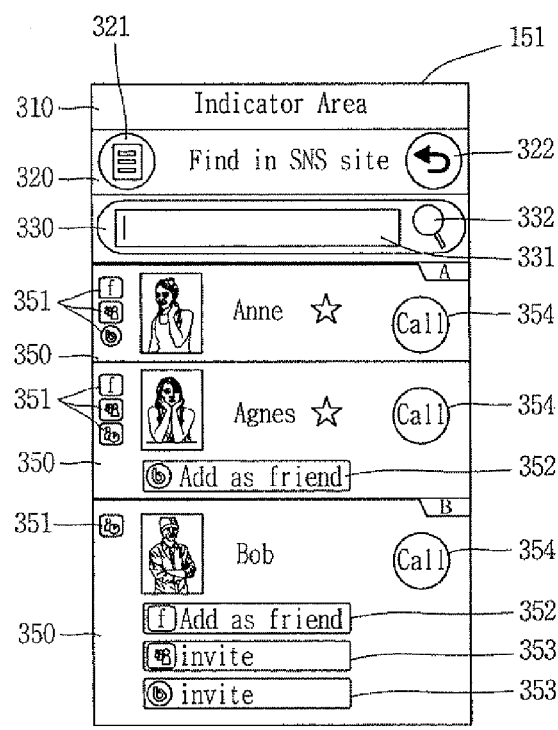
Figure 6D:
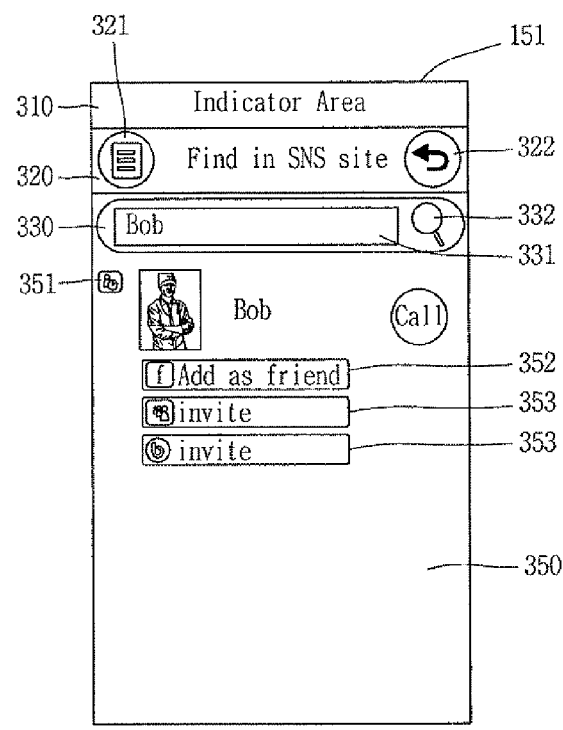

With reference to FIG. 6B, the user may set a search option by manipulating a menu. When the menu icon 321 is selected by the user, the controller 180 displays an option menu for setting a search option as shown in FIG. 6B. When the user selects one item from the option menu, the controller 180 sets the selected item as a search option.

For example, the search option includes "Find in Contacts" for searching a contact person including a search query from the contact list/phone book and "Find in SNS site" for searching for a contact person or friend by searching both the contact list/phone book of the mobile terminal 100 and an SNS site.

After the search query is received, when a touch input applied to the search execution icon 332 is detected, the controller 180 recognizes the touch input as a search command. Subsequently, the controller 180 checks a pre-set search option. Upon checking the pre-set search option, if the search option is "Find in SNS site," the controller 180 connects to a pre-set SNS site. While connecting to the SNS site, the controller 180 searches for a contact person from the contact list/phone book stored in the mobile terminal 100 based on the search query.

When the mobile terminal 100 is connected to the SNS site, the controller 180 transmits a search request message including information about the contact person to be searched to the SNS server 300 via the wireless communication unit 110. The information of the contact person may include an e-mail address and/or name. The SNS server 300 searches using the information about the contact person provided from the mobile terminal 100 and the SNS server 300 transmits the search result to the mobile terminal 100.

In one aspect of the present invention, if a search command is received without a search query, the controller 180 checks whether each of the entire contact persons registered in the contact list/phone book uses an SNS site by sending a search request message to one or more previously set SNS servers 300. In response to the search request message received from the mobile terminal 100, the SNS server 300 checks whether each contact person uses an SNS site and whether each contact person is registered as a friend, and transmits corresponding results to the mobile terminal 100. In other words, the mobile terminal 100 checks whether each contact person stored in the contact list/phone book uses any SNS provided from any one of the SNS servers 300.

Upon receiving a search result from the SNS site, the controller 180 displays an icon 351 indicating each SNS site used by each contact person as shown in FIG. 6C, and displays any applicable command icon depending on whether each contact person uses the corresponding SNS site and whether each person is registered as a friend. For example, the controller 180 displays one or more icons 351, 352 indicating SNS site(s) used by a corresponding contact person. Further, if the contact person is registered as a friend of the terminal user in the corresponding sites, the controller 180 displays icons 351 corresponding to the sites indicating that the contact person is registered as a friend.

If the contact person uses a particular SNS site that the terminal user uses, but is not registered as a friend of the terminal user, the controller 180 displays an "Add as friend" icon 352 such that the terminal user may add the contact person as a friend by selecting the icon 352. Furthermore, if the contact person does not use a particular SNS site that the terminal user uses, the controller 180 displays an invitation icon 353 such that the terminal user may invite the contact person to join the particular SNS site or register to the particular SNS site.

When the terminal user inputs a search query via the search query input window 331 and selects the search execution icon 332 as shown in FIG. 6D, the controller 180 searches for a contact person from the contact list/phone book based on the search query. The controller 180 connects to a pre-set SNS site through the wireless communication unit 110. For example, if "Bob" is input as a search query as shown in FIG. 6D, the controller 180 searches for a contact person including the search query "Bob" from the contact list/phone book. At the same time, the controller 180 connects to the pre-set SNS site and performs a user authentication procedure by using pre-set account information.

Subsequently, the controller 180 transmits a search request message including an e-mail address and/or the name of the searched contact person "Bob" to the pre-set SNS server 300. In response to the search request message, the SNS server 300 checks whether "Bob" is a subscriber of an SNS site or whether "Bob" is registered as a friend of the terminal user by using the information about "Bob". Afterward, the SNS server 300 transmits the result to the mobile terminal 100.

The controller 180 displays the search results obtained by performing the search from the contact list/phone book and additionally displays information provided from the SNS server 300 as shown in FIG. 6D. The controller 180 displays a command icon 352 or 353 based on the information provided from the SNS server 300.

If the searched contact person uses the SNS site to which the terminal user is registered to, but is not registered as a friend of the terminal user, the controller 180 displays the "Add as friend" icon 352. If the "Add as friend" icon 352 is selected by the terminal user, the controller 180 transmits a request message for adding the contact person as a friend to the corresponding SNS site. At the same time, the controller 180 transmits identification information for identifying the corresponding contact person to the SNS site.

In turn, the SNS server requests approval from the contact person by forwarding the identification information to the contact person. Once the contact person approves the request, the contact person is registered as a friend of the terminal user for the SNS site.

Figure 6E:
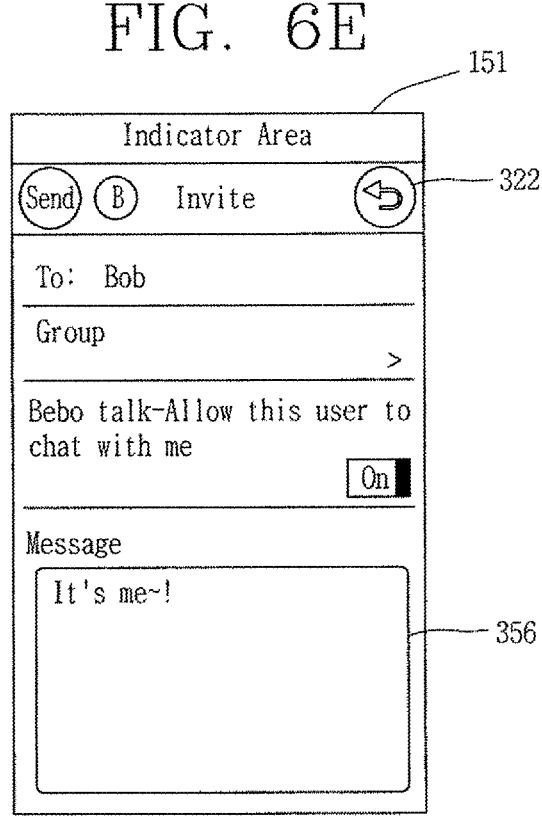

If the searched contact person does not use the SNS site to which the terminal user is registered, the controller 180 displays the invitation icon 353 and may invite the corresponding contact person in response to a user input. For example, when the terminal user selects the invitation icon 353, the controller 180 outputs a message creation screen image 356 on the display unit 151 to receive an invitation message as shown in FIG. 6E. When the terminal user composes an invitation message, the controller 180 transmits the invitation message to the contact person according to a pre-set transmission method, such as a short message or an e-mail. Upon receiving the invitation message, the contact person may connect to and register with the corresponding SNS site.

Figure 7A:
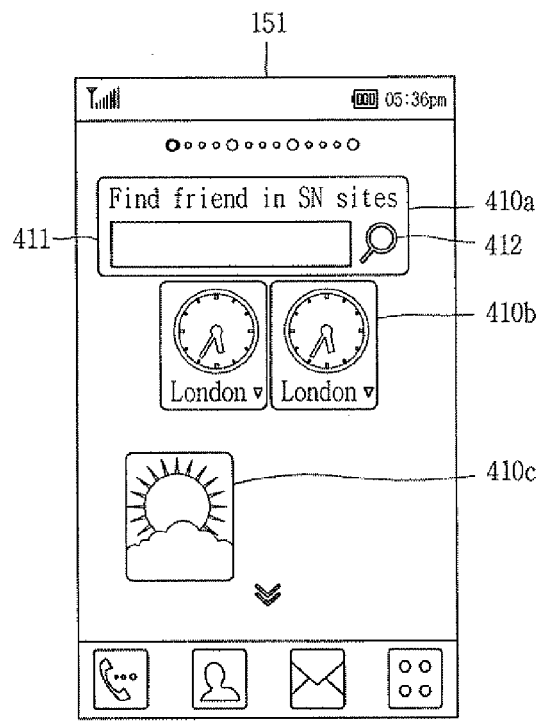
FIGS. 7A to 7C illustrate searching for a contact person or friend in a mobile terminal by interacting with an SNS site according to another embodiment of the present invention.
Figure 7B:
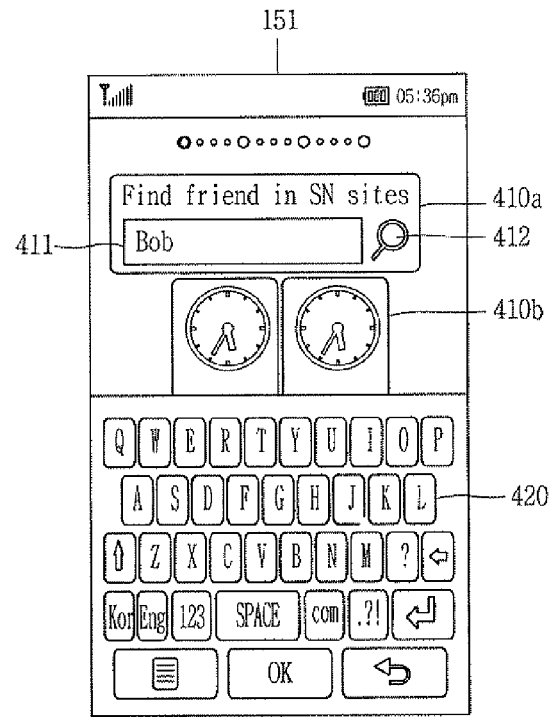
Figure 7C:
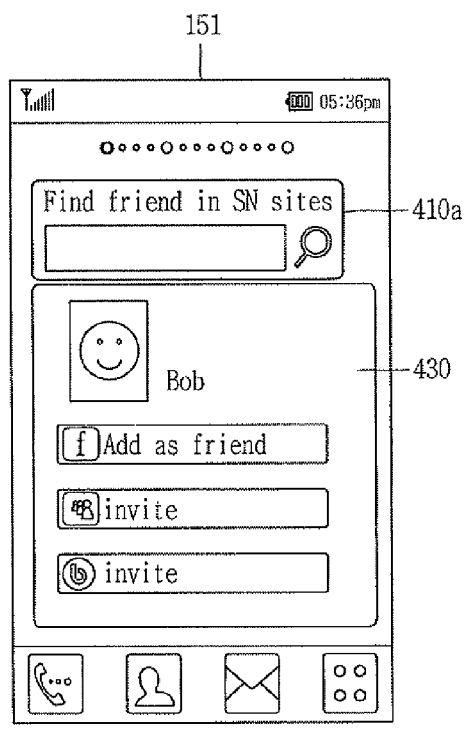

FIGS. 7A to 7C illustrate searching for a contact person or friend in a mobile terminal 100 according to another embodiment of the present invention. As shown in FIG. 7A, the mobile terminal 100 displays pre-set widgets 410a to 410c on a home screen or background screen image.

When a search widget 410a is selected on the home screen, the controller 180 executes a search function and enters an input mode in which a search query can be received. As shown in FIG. 7B, the controller 180 places a cursor at the search query input window 411 of the search widget 410a and displays a keypad icon 420.

When the terminal user manipulates the keypad icon 420 displayed on the display screen and inputs data, for example "Bob," the controller 180 displays the received data in the search query input window 411. After receiving the search query, the controller 180 searches for a contact person from the contact list/phone book based on the received search query "Bob" when the search icon 412 is selected by the terminal user. When searching of the contact person is completed, the controller 180 connects to one or more previously registered SNS sites to check whether the searched contact person uses the corresponding SNS sites.

If the contact person uses a corresponding SNS site, the controller 180 checks whether the contact person is registered as a friend of the terminal user. Upon checking, the controller 180 displays information about the SNS site(s) that the searched contact person uses and whether the searched contact person is registered as a friend of the terminal user as a pop-up window 430 on the display screen as shown in FIG. 7C.

Figure 8:
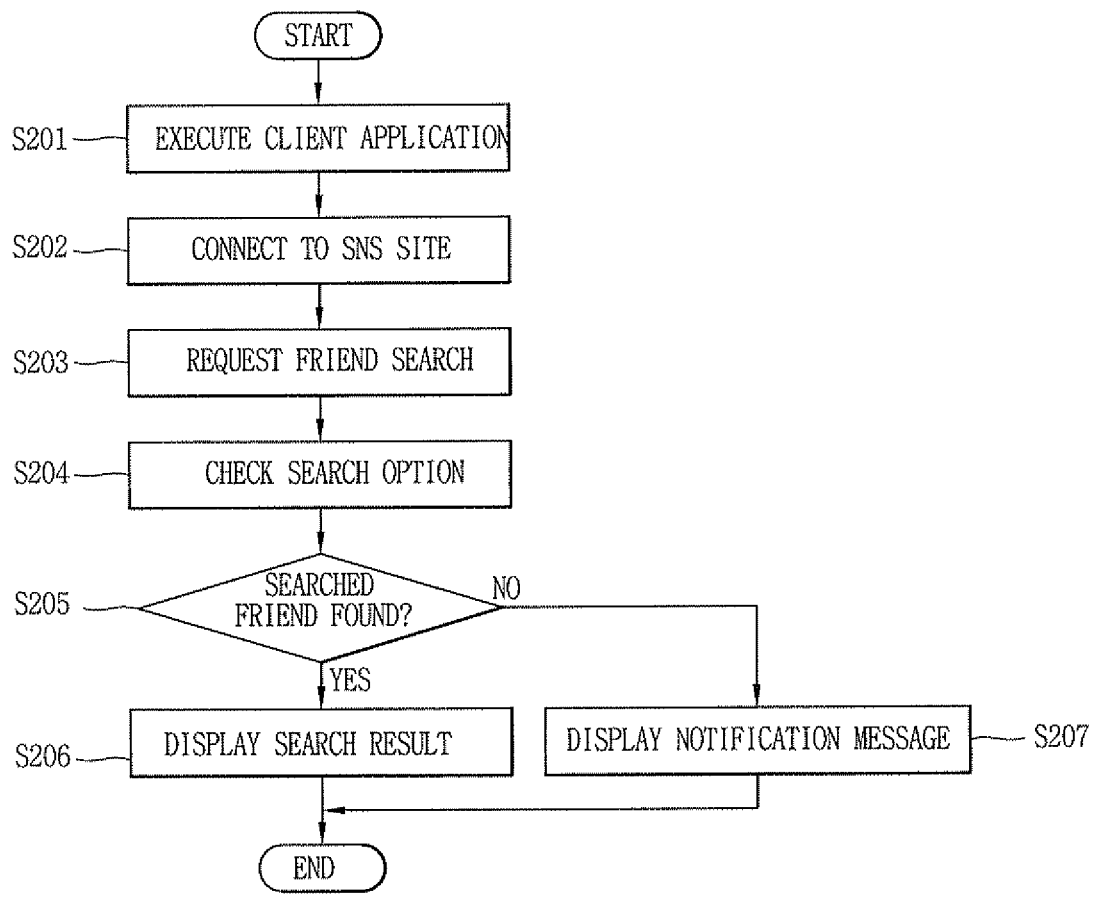
FIG. 8 is a flowchart illustrating searching for a contact person or friend in a mobile terminal according to another embodiment of the present invention.

With reference to FIG. 8, the controller 180 executes a client application in response to a user input (S201). Subsequently, the controller 180 connects to an SNS site through the executed client application (S202). At this time, the controller 180 performs an authentication procedure on the SNS site by using pre-set user information, such as ID and password. The user information may be previously set as shown in FIG. 4A or may be manually input by the terminal user whenever connected to an SNS site.

After connection to the SNS site, when a contact person/friend search is requested by the terminal user (S203), the controller 180 checks whether a search option has been set (S204). For example, if a search query input window is selected by the terminal user on the executed client application screen image, the controller 180 enters an input mode in which a search query can be received and displays a cursor on the search query input window.

When the terminal user inputs a search query via the user input unit 130, the controller 180 displays the received search query on the search query input window. After receiving the search query, the controller 180 checks whether a search option has been set when a search command is input by the terminal user. The search option may include "Find in Currently connected SNS Site," "Find in phone book," "Find in a different network," and "Invitation."

Subsequently, the controller 180 searches for a contact person/friend based on the received search query according to the checked search option (S205). For example, the search query may include an e-mail or a name.

If the search option is "Find in Currently connected SNS Site," the controller 180 transmits a search request message including the received search query to the currently connected SNS server 300. In response to the search request message, the SNS server 300 searches an SNS site subscriber substantially matching the search query.

If the search option is "Find in phone book," the controller 180 searches a contact person from the contact list/phone book based on the received search query. Subsequently, the controller 180 transmits a search request message along with the information about the contact person to be searched, such as e-mail and/or name, to the currently connected SNS server.

The SNS server 300 then performs contact person/friend searching by using the information about the searched contact person. The SNS server 300 checks whether the searched contact person is a subscriber of the currently connected SNS site and transmits the result to the mobile terminal 100. The controller 180 of the mobile terminal 100 receives the checked result through the wireless communication unit 110.

If the search option is "Find in different network," the controller 180 connects to one or more different networks in response to the user command for requesting a user address list of the connected network. The controller 180 receives the user address list from the network and displays it. When one or more of friends on the displayed user list are selected, the controller 180 transmits a message inviting the selected friends to the currently connected SNS site.

If the search option is "Invitation," the controller 180 transmits an invitation message to a specific friend according to a user input. When contact person/friend searching is completed, the controller 180 displays a searched contact person/friend list (S206). If no contact person/friend is found after searching based on the search query in step S205, the controller 180 displays a notification message indicating that no search result has been received from the SNS server (S207).

Figure 9A:
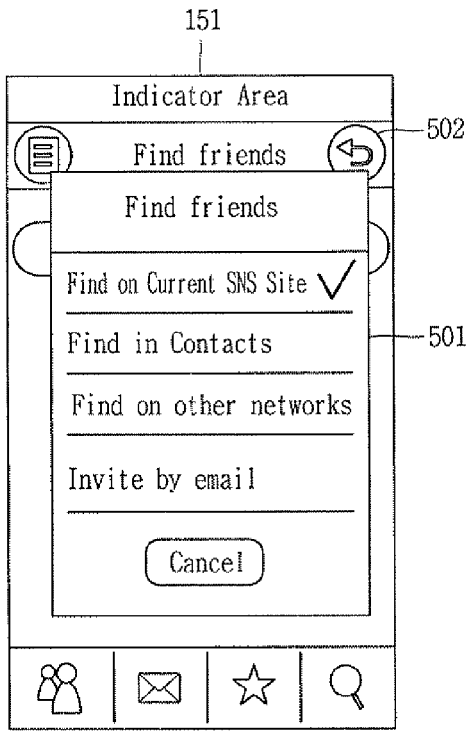
FIGS. 9A to 9D illustrate searching for a contact person or friend in a mobile terminal according to an embodiment of the present invention.

FIGS. 9A to 9D illustrate searching for a contact person or friend in a mobile terminal 100 according to yet another embodiment of the present invention. Referring to FIG. 9A, when a search menu such as "Find Friends" is selected by the terminal user from the SNS site access screen image, a sub-menu 501 of the search menu is displayed in a pop-up manner on the display screen. Alternatively, when the search menu is selected, the controller 180 may immediately enter a search query input mode in which a search query can be input, and display the search screen on the display unit 151.

Thereafter, when a menu button 502 is selected on the search screen, the controller 180 displays the sub-menu 501 of the search menu as shown in FIG. 9A. For example, the sub-menu includes search options such as "Find on the current SNS site," "Find in contacts," "Find on other networks," and "Invitation by email."

When "Find on current SNS site" is selected from the sub-menu, the controller 180 executes the selected sub-menu item. Subsequently, the controller 180 displays a search screen and an executed screen image of the sub-menu selected by the terminal user on the display screen.

Figure 9B:
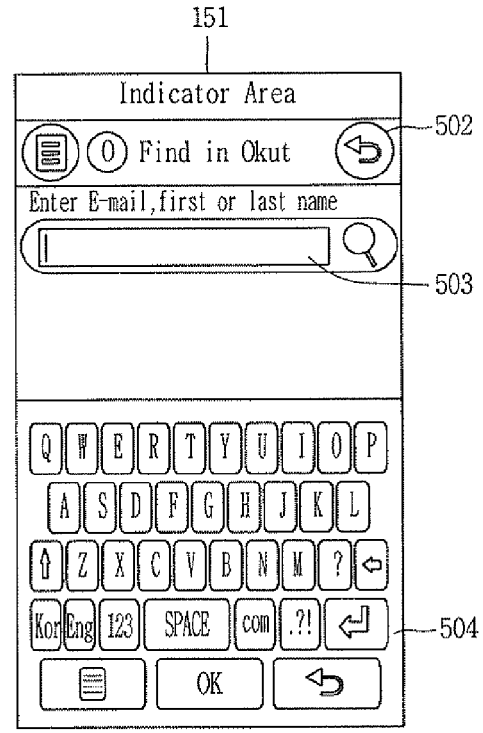
Figure 9C:
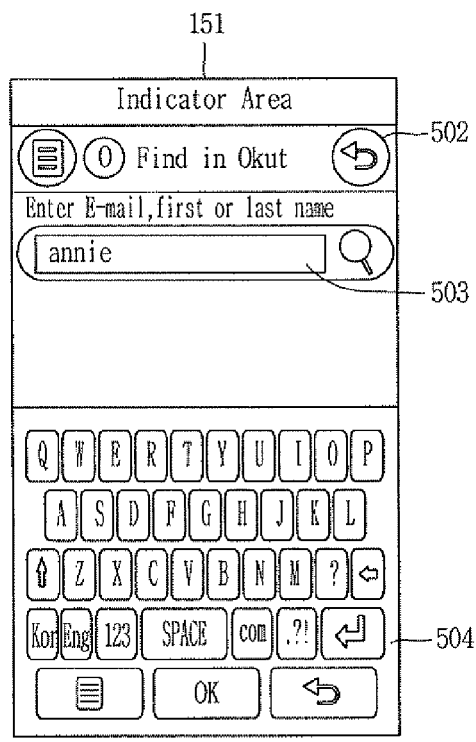

With reference to FIG. 9B, the search screen includes a search query input window 503 displaying a search query received from the terminal user and a virtual keypad 504 used for inputting the search query. When the virtual keypad 504 is touched, the controller 180 displays keypad data corresponding to the touched point in the search query input window 503, as shown in FIG. 9C.

Figure 9D:
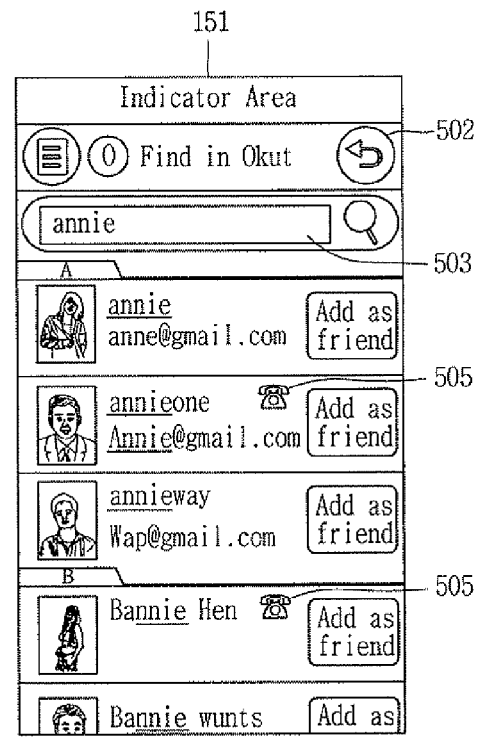

Thereafter, when a search command is input by the terminal user, the controller 180 searches for a contact person or friend from the SNS site subscribers according to the search query. When the friend searching is completed, the controller 180 displays the search result on the display screen as shown in FIG. 9D. The controller 180 also checks whether the searched contact person/friend(s) are registered as friend(s) of the terminal user and displays the friend status.

Furthermore, the controller 180 checks whether the searched contact person/friend is a contact person present in the contact list/phone book stored in the memory of the mobile terminal 100 and may display an exist icon 505 indicating that the searched contact person/friend exists in the contact list/phone book. Alternatively or in addition to the exist icon 505, the controller 180 may change the color and/or the thickness of characters of an item corresponding to the searched contact person/friend that is present in the contact list/phone book.

Figure 10A:
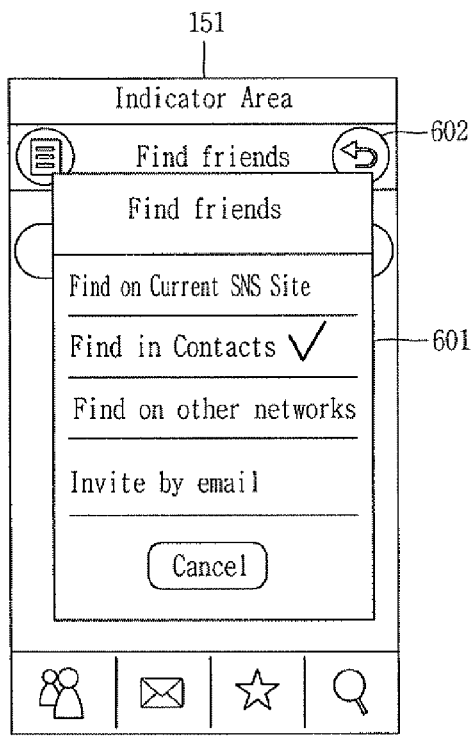
FIGS. 10A to 10D illustrate searching for a contact person or friend in a mobile terminal according to another embodiment of the present invention.

FIGS. 10A to 10D illustrate searching for a contact person or friend in a mobile terminal 100 according to yet another embodiment of the present invention. With reference to FIG. 10A, when the client application is executed by the user, the controller 180 displays the executed screen image on the display unit 151.

When a menu button displayed in a title display area 602 is selected from the executed screen image, the controller 180 displays a sub-menu 601 or search option in a pop-up manner. When "Find in Contacts" is selected from the sub-menu 601, the controller 180 executes the corresponding sub-menu item. Subsequently, the controller 180 displays a screen image of the executed sub-menu item on the display unit 151.

Figure 10B:
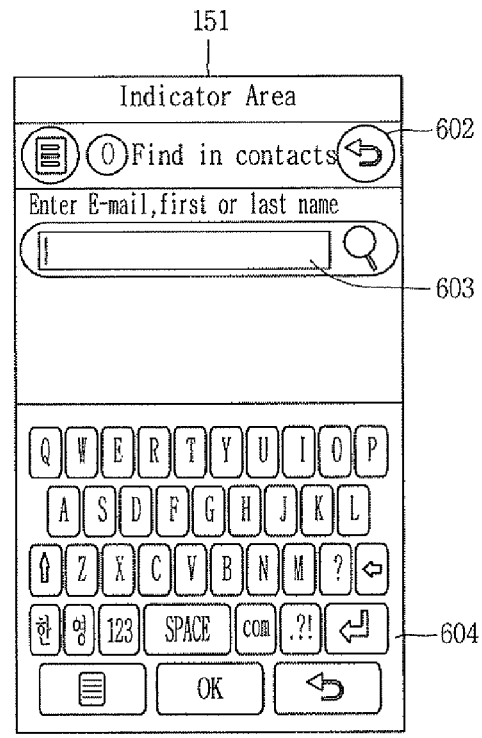

With reference to FIG. 10B, when a search query input window 603 is displayed, the controller 180 enters a search query input mode and displays a virtual keypad 604 for receiving a search query. The controller 180 also displays a cursor at the search query input window 603. For example, when the terminal user touches the search query input window 603, the mobile terminal 100 activates the search query input window 603 such that a search query can be input and displays the cursor at the search query input window 603.

Figure 10C:
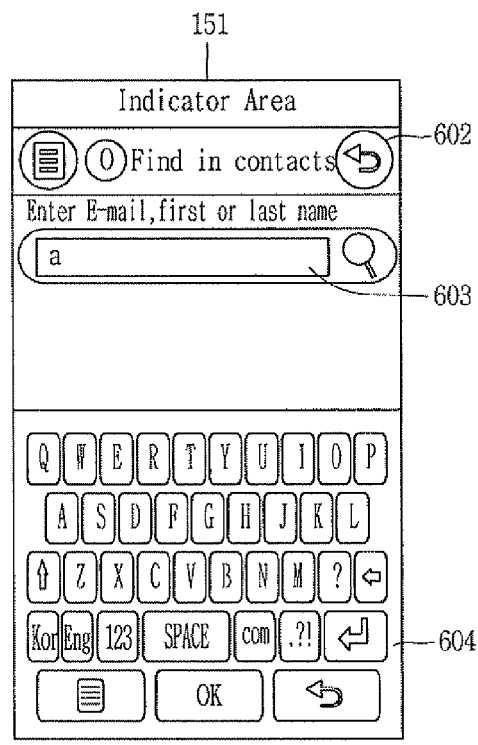

When a search query is received via the virtual keypad 604 in the search query input mode, the controller 180 displays the received search query in the search query input window 603 as shown in FIG. 10C. For example, when a touch input applied to the virtual keypad 604 is detected, the controller 180 displays key data corresponding to the touch-detected point to the search query input window 603.

Thereafter, when a search command is input by the terminal user, the controller 180 searches for a contact person from the contact list/phone book stored in the mobile terminal 100 based on the search query received. The controller 180 checks whether the contact person is a subscriber of the SNS site currently accessed by the mobile terminal 100. If the searched contact person is a subscriber, the controller 180 checks whether the contact person is registered as a friend in the SNS site.

In other words, the controller 180 searches for the contact person including the received search query from the contact list/phone book, and transmits a search request message including information about the searched contact person to the currently accessed SNS site. The SNS site checks whether the contact person is a subscriber of the currently accessed SNS site by using the information about the contact person included in the request message. Upon checking, the SNS site transmits the check result to the mobile terminal 100.

Figure 10D:
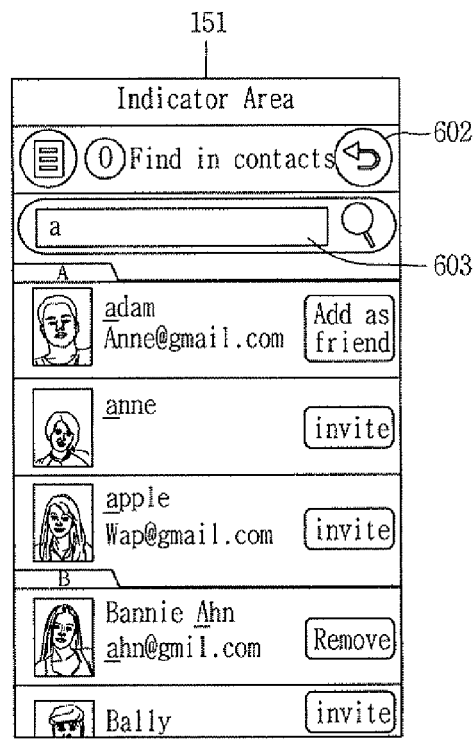

When friend searching is completed, the controller 180 displays the searched contact person/friend list as shown in FIG. 10D. The controller 180 displays command icons for adding the contact person as a friend, inviting the contact person to register to the SNS site, or removing the contact person from the friend list for each of the searched friend items depending on whether the searched contact person/friend uses the SNS site and/or whether the searched friend is registered as a friend of the terminal user.

Figure 11A:
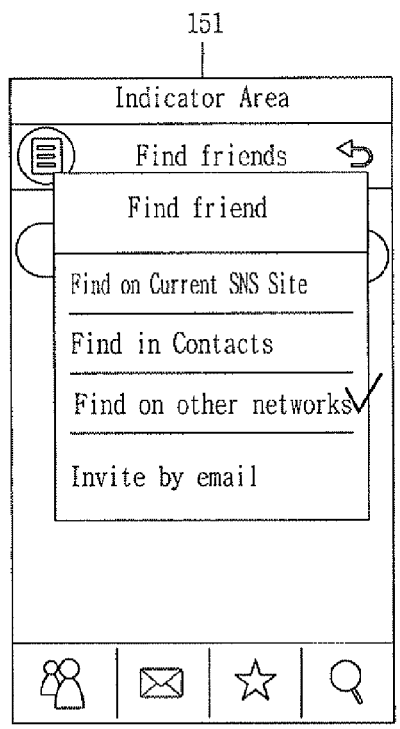
FIGS. 11A to 11D illustrate searching for a contact person or friend in a mobile terminal according to yet another embodiment of the present invention.
Figure 11B:
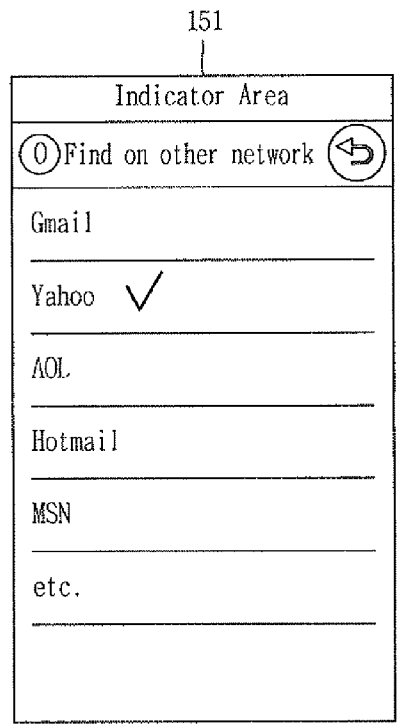

FIGS. 11A to 11D illustrate searching for a contact person or friend in a mobile terminal according to yet another embodiment of the present invention. With reference to FIG. 11A, the controller 180 displays sub-menus of the friend search menu in response to a user input. When "Find on other networks" is selected from the sub-menus, the controller 180 displays a list of one or more different networks as shown in FIG. 11B.

Figure 11C:
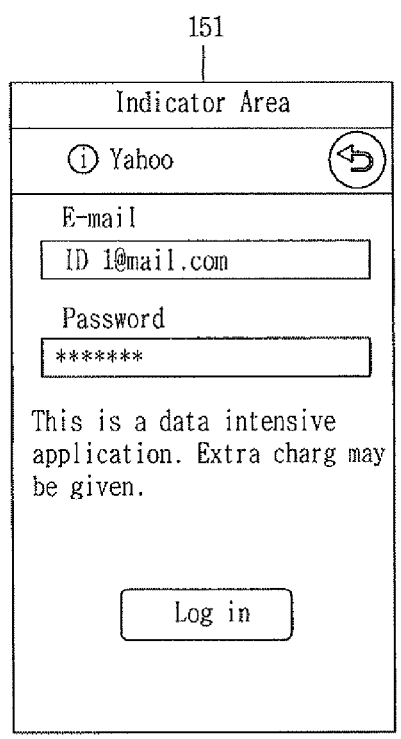

When one network, for example "Yahoo," is selected from the network list, the controller 180 displays a user information input screen for receiving user information for the selected network connection as shown in FIG. 11C. Once the user information, such as an e-mail and a password of the terminal user is received, when a "Log in" icon is selected, the controller 180 connects to the corresponding network and perform an authentication procedure.

When authentication is successful, the controller 180 requests address list information of the corresponding network from a different network server. In response to the request from the mobile terminal 100, the different network server transmits the address list information of the terminal user to the mobile terminal 100.

Figure 11D:
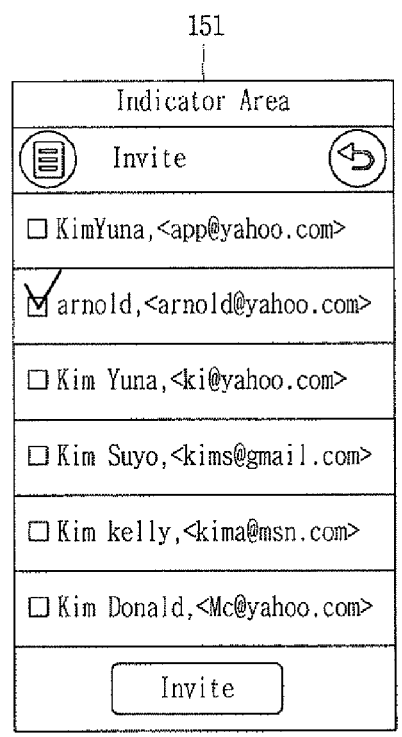

The controller 180 of the mobile terminal 100 displays the address list information received via the wireless communication unit 110. For example, the controller 180 displays a friend list including one or more friends registered in the address list as shown in FIG. 11D.

Thereafter, the terminal user selects one or more friends to be invited to the SNS site accessed by the mobile terminal 100 from the displayed friend list. For example, when the terminal user touches a check box displayed at one side of the friend list, as shown in FIG. 11D, the controller 180 indicates that the corresponding item has been selected in the check box.

Subsequently, when an invitation icon is selected, the controller 180 transmits an invitation message to an e-mail address of the selected friend. The controller 180 may transmit the invitation message through a text message, as well as through the e-mail.

Figure 12A:
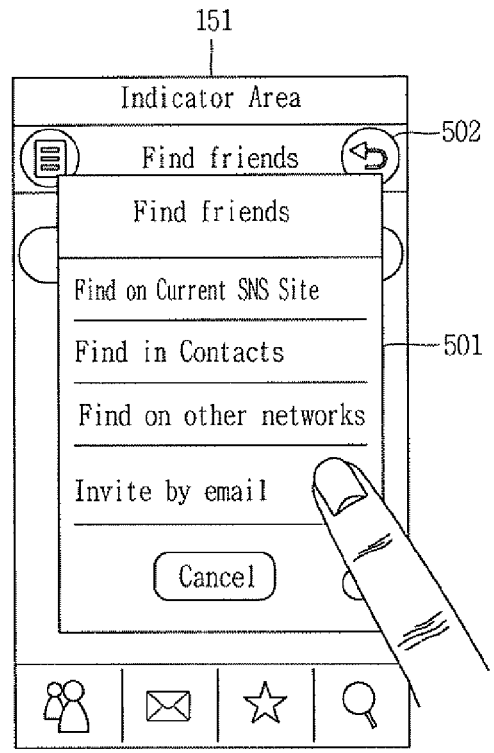
FIGS. 12A and 12B illustrate inviting a friend by e-mail in a mobile terminal according to an embodiment of the present invention.
Figure 12B:
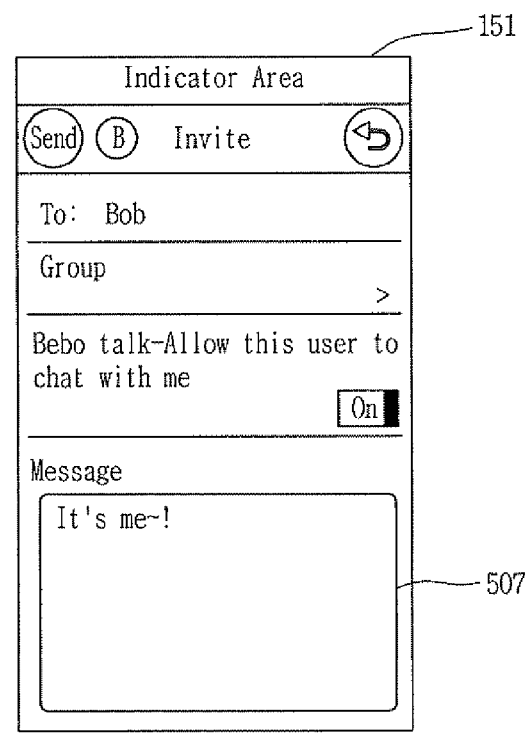

FIGS. 12A and 12B illustrate inviting a friend by e-mail in a mobile terminal according to an embodiment of the present invention. When the client application is executed in the mobile terminal 100 and a friend search is selected from the menu, the controller 180 displays search options 501 for selecting the friend search option on a pop-up window.

When the item "Invite by e-mail" is selected from the search options 501, the controller 180 displays a invitation message composing screen 507. The terminal user inputs a message through the user input unit 130 and composes an invitation message on the invitation message composing screen 507. If the contact person to be invited is searched and selected from the contact list/phone book, the terminal user can input an e-mail address of the invitee by selecting the email address listed in the contact list/phone book or may directly input the e-mail address of the invitee by typing.

When the invitee accepts the invitation, the terminal user may set a group to which the invitee will be included. For example, when the terminal user selects "Groups" (not shown) from the screen, the controller 180 displays a group list listing the SNS site addresses of the terminal user.

When one SNS site is selected from the group list, the controller 180 inserts the group information. Further, the controller 180 may set a "Bebo Talk" such that a talk request permission is set as ON/OFF according to a user input.

Figure 13A:
FIGS. 13A and 13B illustrate registering a friend in a mobile terminal according to an embodiment of the present invention.
Figure 13B:
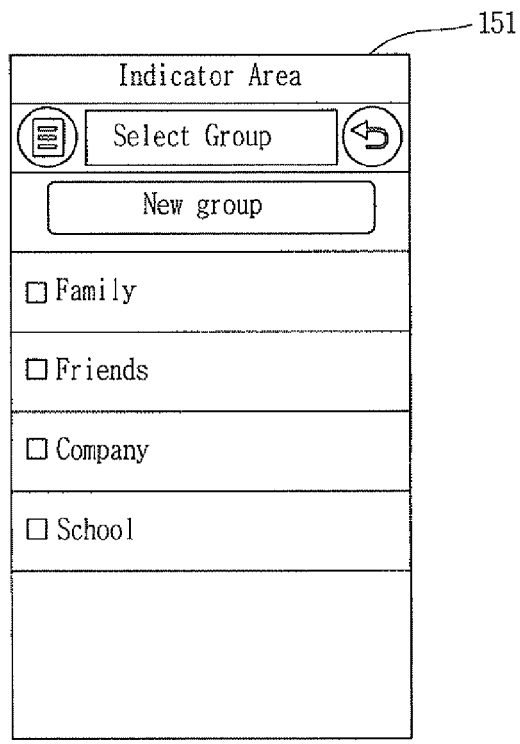

FIGS. 13A and 13B illustrate registering a friend in a mobile terminal 100 according to an embodiment of the present invention. When a friend search result is displayed on the display screen as shown in FIG. 9D or 10D and the "Add as friend" icon is selected from the screen, the controller 180 displays a friend request message composing screen as shown in FIG. 13A. The terminal user designates a group to which a selected friend is to belong and composes a request message in the friend request message composing screen by manipulating the user input unit 130.

For example, when a group item is selected from the friend request message composing screen of FIG. 13A, the controller 180 displays a group select screen as shown in FIG. 13B. The group select screen displays a group list. When one group is selected from the group list, the controller 180 designates the selected group as a group to which the friend is to belong.

When the friend request message is composed, the controller 180 transmits the composed message to the selected friend in the form of an e-mail or a text message. Thereafter, upon receiving the friend request message, if the selected friend accepts the friend request, the selected friend is added to the designated group of the SNS site address list. If the selected friend does not accept the friend request, the terminal user receives a notification message informing that the friend request has been refused. Specifically, the SNS server transmits the notification message to the mobile terminal 100.

Figures 14A, 14B:
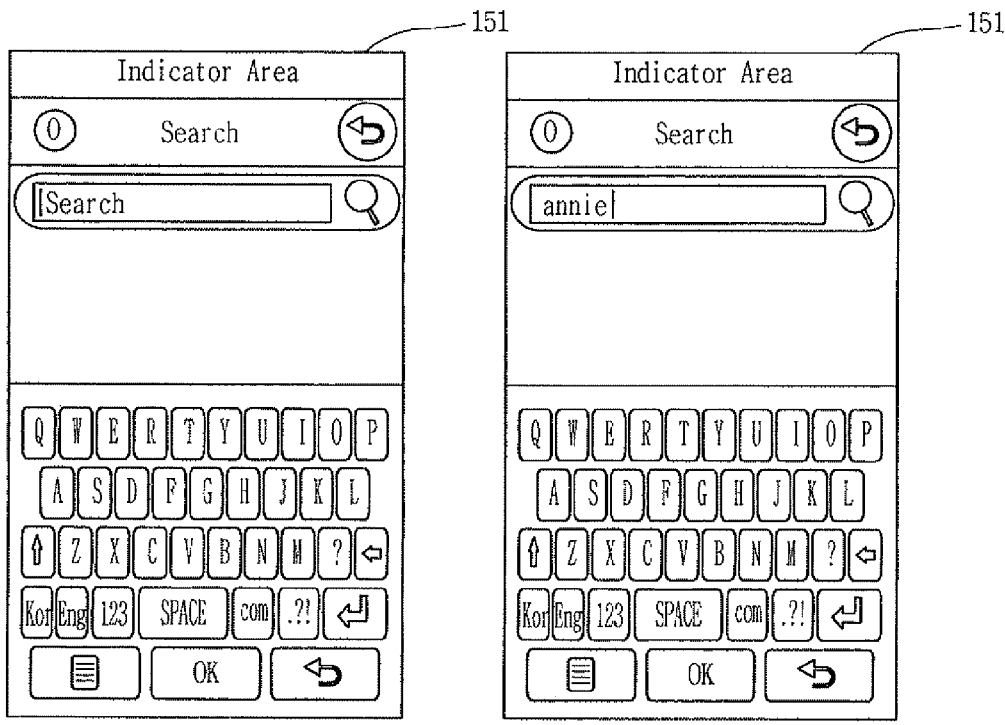
FIGS. 14A to 14C illustrate performing a search by inputting a search query in a mobile terminal according to an embodiment of the present invention.
Figure 14C:
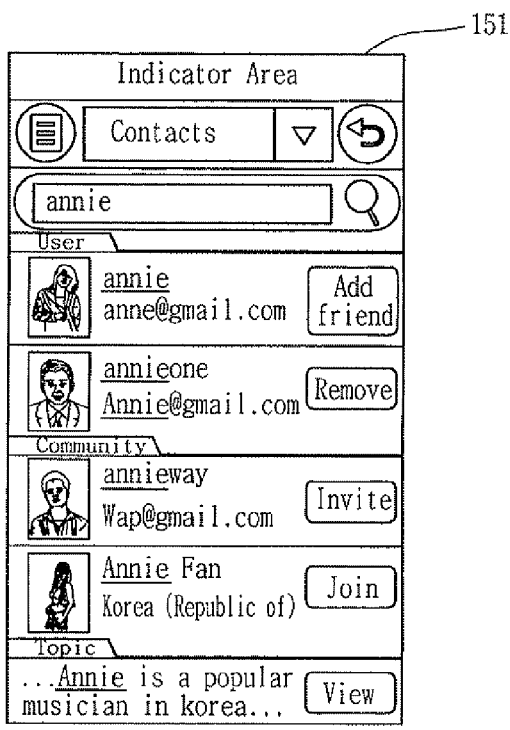

FIGS. 14A to 14C illustrate searching for a contact person in a mobile terminal 100 according to an embodiment of the present invention. When an integrated search menu is selected while the mobile terminal 100 is connected to the SNS site through the client application, the controller 180 executes an integrated search function.

While the integrated search function is executed, the controller 180 enters an input mode in which a search query can be input and activates a search query input window when the search query input window is selected. Further, the controller 180 displays a cursor at the search query input window.

Thereafter, when the user inputs a search query via the user input unit 130, the controller 180 displays the received search query in the search query input window. After the search query is received, the controller 180 searches information based on the search query when a search command is input. The category may include an SNS site user, a community, and a topic.

When displaying the search result, a portion consistent with the search query may be displayed to be thicker and/or underlined. Moreover, the controller 180 of the mobile terminal 100 provides different command icons according to a search category.

For example, as shown in FIG. 14C, when searching a site user, command icons such as "Add friend," "Remove," an "Invite," are provided. If searching a community, command icons such as "Join" may be provided at one side of the search result. In addition, when the search category is a topic, a command icon such as "View" may be provided.

The controller 180 receives search results that are less than a pre-set maximum number of results for each category and displays the search results on the display screen. If there are more search results than the maximum number of search results displayed, the controller 180 displays a further view command icon below the last item of the search result list for each category. When the further view icon is selected, the next search result is fetched from the SNS site and displayed. When a photo image, a name, or a text area is touched from the search result list screen, the controller 180 receives detailed information regarding the corresponding result item from the SNS server and displays the detailed information.

As described herein, the mobile terminal 100 according to embodiments of the present invention can search for a contact person or friend by interacting with the contact list/phone book of the mobile terminal 100 and the SNS 300. Command icons, such as "Add friend," "Remove," and "Invite," are selectively provided depending on whether a contact person stored in the contact list/phone book uses an SNS and/or whether the contact person is registered as a friend of the terminal user. Thus, the terminal user can register/delete a searched contact person or invite the contact person to the SNS site by using the command icons.

In the embodiments of the present invention, the methods described herein can be implemented as codes that can be read by a computer in a program-recorded medium. The computer-readable medium includes various types of recording devices in which data read by a computer system is stored.

The computer-readable medium may include a ROM, a RAM, a CD-ROM, a magnetic tape, a floppy disk, an optical data storage device, and the like. The computer-readable medium may also include implementations in the form of carrier waves or signals (e.g., transmission via the Internet). The computer may include the controller 180 of the mobile terminal 100.

As the exemplary embodiments may be implemented in several forms without departing from the characteristics thereof, it should also be understood that the embodiments described herein are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a display configured to display information;
a wireless communication unit configured to communicate with a plurality of servers providing a plurality of social network services of which a user of the mobile terminal is a subscriber, each of the plurality of servers providing a different social network service;
a memory configured to store a plurality of contacts and the user's account information related to the plurality of social network services;
a user input unit configured to receive a command for searching for at least one contact; and
a controller configured to:
cause the display to display a contact list along with a menu icon for setting a search option;
cause the display to display an option menu for setting the search option in response to selection of the menu icon, the option menu comprising a first search option for searching for the at least one contact only from the plurality of contacts stored in the memory and a second search option for searching for the at least one contact from both the plurality of contacts stored in the memory and the plurality of servers;
search for the at least one contact among the plurality of contacts stored in the memory in response to the command according to the set search option;
cause the wireless communication unit to transmit information of the searched at least one contact to each of the plurality of servers when the search option is set to the second search option;
receive, via the wireless communication unit, a plurality of search results from the plurality of servers, the plurality of search results indicating whether the searched at least one contact is registered with at least one of the plurality of social network services and whether the searched at least one contact is registered as a friend with regard to the registered at least one of the plurality of social network services;

update the contact list including the searched at least one contact based on the plurality of search results received from the plurality of servers; and cause the display to display the updated contact list with a plurality of icons associated with the searched at least one contact or each of the plurality of contacts, wherein each of the plurality of icons represents a corresponding one of the plurality of social network services and indicates a status of the searched at least one contact or a status of each of the plurality of contacts with respect to the corresponding one of the plurality of social network services.

2. The mobile terminal of claim 1, wherein information of the at least one contact comprises at least a phone number, a name, an email, a home page address, or a user name.

3. The mobile terminal of claim 1, wherein the account information is pre-stored in the memory.

4. The mobile terminal of claim 1, wherein the wireless communication unit is further configured to connect to the plurality of servers while the controller is searching for the at least one contact.

5. The mobile terminal of claim 1, wherein:
the memory is further configured to store a client application for executing at least one of the social network services; and
the command is received via the user input unit while the client application is executed at the mobile terminal.

6. The mobile terminal of claim 1, wherein the controller is further configured to cause the display to display:
a first contact that is searched from the plurality of contacts and registered with at least one of the plurality of social network services;
a first icon associated with the first contact, wherein the first icon is for adding the searched first contact as a friend in the at least one of the plurality of social network services;
a second contact that is searched from the plurality of contacts and not registered with any one of the plurality of social network services; and
a plurality of second icons associated with the second contact, wherein the plurality of second icons are for inviting the searched second contact to register with each of the plurality of social network services.

7. The mobile terminal of claim 1, wherein the user input unit comprises a touch screen.

8. The mobile terminal of claim 1, wherein the plurality of icons correspond to all social network services for which the user is registered as a subscriber.

9. The mobile terminal of claim 1, wherein the command comprises a search query associated with the at least one contact.

10. The mobile terminal of claim 1, wherein:
the command is received without a search query;
the searched at least one contact comprises each of the plurality of contacts; and
each of the plurality of contacts in the updated contact list is displayed with the plurality of icons such that a different set of the plurality of icons is displayed based on whether each of the plurality of contacts is registered with any one of the plurality of social services and whether each of the plurality of contacts is registered as a friend with the user with respect to any one of the plurality of social services.

11. A mobile terminal comprising:
a user input unit configured to receive:
a command for finding a contact from a plurality of contacts; and
a search query;
a memory configured to store the plurality of contacts;
a controller configured to search for the contact from the plurality of contacts stored in the memory based on the received search query;
a wireless communication unit configured to communicate with a website server providing a social network service to at least transmit or receive data associated with the searched contact to or from the website server; and
a display unit configured to display:
a contact list, including the plurality of contacts, along with a menu icon for setting a search option;
the search query received via the user input unit;
a search result including information related to the searched contact; and
an icon associated with the searched contact,
wherein:
the controller is further configured to search for the contact according to a preset mode selected from a search option, the search option comprising:
a first search option for searching for the contact only from the plurality of contacts stored in the memory; and
a second search option for searching for the contact from the plurality of contacts stored in the memory and then searching for the contact from a plurality of website servers, using the information related to the contact searched from the plurality of contacts stored in the memory;
the controller is further configured to cause the display unit to display an option menu for setting the search option in response to selection of the menu icon, the option menu comprising the first search option and the second search option;
the controller is further configured to cause the wireless communication unit to transmit the search result to the plurality of website servers to be compared with information of social network service subscribers stored at each of the plurality of website servers when the search option is set to the second search option, each of the plurality of website servers providing a corresponding one of a plurality of social network services that are registered in the mobile terminal;
the controller is further configured to cause the display unit to display a plurality of icons associated with the searched contact based on information received from each of the plurality of website servers, the received information indicating whether the searched contact is registered with at least one of the plurality of social network services and whether the searched contact is registered as a friend with regard to the registered at least one of the plurality of social network services, and each of the plurality of icons representing a corresponding one of the plurality of social networking services; and
the plurality of icons comprise an icon for adding the searched contact as a friend in at least one of the plurality of social network services if the searched contact is registered with the at least one of the plurality of social network services and not yet registered as the friend with regard to the at least one of the plurality of social network services, an icon for indicating the searched contact as a friend in at least one of the plurality of social network services if the searched contact is registered as the friend with regard to the at least one of the plurality of social network services, or an icon for inviting the searched contact to register with at least one of the plurality of social network services if the searched contact is not registered with the at least one of the plurality of social network services.

12. The mobile terminal of claim 11, wherein the information related to the searched contact comprises at least a phone number, a name, an email, a home page address, or a user name.

13. The mobile terminal of claim 11, wherein the memory is further configured to store a user's social network service account information and the controller is further configured to connect to the website server by using the social network service account information stored in the memory.

14. A method of searching for a contact in a mobile terminal, the method comprising:
    connecting to a server providing a social network service and having information about social network service subscribers by using user account information related to the social network service;
    displaying, via a display of the mobile terminal, a contact list, including a plurality of contacts, along with a menu icon for setting a search option;
    displaying, via the display, an option menu for setting the search option in response to selection of the menu icon, the option menu comprising a first search option for searching for the contact only from the plurality of contacts stored in the mobile terminal and a second search option for searching for the contact from both the plurality of contacts stored in the mobile terminal and a plurality of servers;
    receiving, via an input unit of the mobile terminal, a search query for searching for the contact based on at least contact information stored in the mobile terminal or the server, the received search query comprising at least partial text associated with the contact to be searched;
    displaying, via the display, at least a search query input window including the received search query and a search result including at least the searched contact;
    connecting to the plurality of servers when the search option is set to the second search option, each of the plurality of servers providing a corresponding one of a plurality of social network services of which a user of the mobile terminal is a subscriber;
    communicating with the plurality of servers to share at least partial information associated with the searched contact when the search option is set to the second search option;
    updating the contact information stored in the mobile terminal based on information related to the searched contact that is received from the plurality of servers, the received information indicating whether the searched contact is registered with at least one of the plurality of social network services and whether the searched contact is registered as a friend with regard to the registered at least one of the plurality of social network services; and
    displaying the updated contact information via the display, the searched contact in the updated contact information being displayed with a plurality of icons, each of the plurality of icons representing a corresponding one of the plurality of social network services and indicating a status of the searched contact or a status of each of the plurality of contacts with respect to the corresponding one of the plurality of social network services.

15. The method of claim 14, wherein the plurality of icons comprise at least an icon for adding the searched contact as a friend in at least one of the plurality of social network services, an icon for indicating the searched contact as a friend in at least one of the plurality of social network services, or an icon for inviting the searched contact to register with at least one of the plurality of social network services based on a status of the searched contact with respect to each of the plurality of social network services.

16. The method of claim 14, further comprising displaying the contact information including a contact corresponding to the searched contact prior to receiving the search query, the plurality of icons not being displayed.

17. The mobile terminal of claim 1, wherein the display is further configured to display a search query input window and to display a search query received via the user input unit in the search query input window to search for the at least one contact.

18. The mobile terminal of claim 17, wherein the display is further configured to display a search result based on the received search query while the search query is displayed in the search query input window.

19. The mobile terminal of claim 1, wherein the controller is further configured to check whether each of the plurality of contacts stored in the memory is a registered user of at least one of the plurality of social network services in response to the command.

20. The mobile terminal of claim 1, wherein the controller is further configured to cause the display to display a search result along with applicable command icons related to the searched at least one contact based on whether the searched at least one contact is registered as the friend.

21. The mobile terminal of claim 20, wherein the command icons comprise at least an icon for removing the searched at least one contact from registration as the friend.

* * * * *